US012755523B2

(12) United States Patent
Wu et al.

(10) Patent No.: US 12,755,523 B2
(45) Date of Patent: Oct. 6, 2026

(54) METHOD AND DEVICE FOR DATA PROCESSING

(71) Applicant: Beijing Zitiao Network Technology Co., Ltd., Beijing (CN)

(72) Inventors: Jie Wu, Beijing (CN); Yuxi Ren, Beijing (CN); Xuefeng Xiao, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 324 days.

(21) Appl. No.: 18/579,178

(22) PCT Filed: May 23, 2022

(86) PCT No.: PCT/CN2022/094556
§ 371 (c)(1),
(2) Date: Jan. 12, 2024

(87) PCT Pub. No.: WO2023/284416
PCT Pub. Date: Jan. 19, 2023

(65) Prior Publication Data

US 2024/0320966 A1 Sep. 26, 2024

(30) Foreign Application Priority Data

Jul. 15, 2021 (CN) ......................... 202110802048.4

(51) Int. Cl.
*G06V 10/82* (2022.01)
*G06V 10/77* (2022.01)

(52) U.S. Cl.
CPC .......... *G06V 10/82* (2022.01); *G06V 10/7715* (2022.01)

(58) Field of Classification Search
CPC .... G06V 10/82; G06V 10/77; G06V 10/7715; G06F 16/58; G06N 3/045; G06N 3/047; G06N 3/084; G06N 3/088; G06N 3/08
See application file for complete search history.

(56) References Cited

U.S. PATENT DOCUMENTS 11,321,587 B2 * 5/2022 Perincherry ............ G06N 3/08
11,429,860 B2 * 8/2022 Li ......................... G06N 3/084
(Continued)

FOREIGN PATENT DOCUMENTS

CN 106548190 A 3/2017
CN 110458765 A 11/2019
(Continued)

OTHER PUBLICATIONS

Zhang, Yiman, et al. "Data-free knowledge distillation for image super-resolution." Proceedings of the IEEE/CVF Conference on Computer Vision and Pattern Recognition. 2021. (Year: 2021).*
(Continued)

*Primary Examiner* — Stephen R Koziol
*Assistant Examiner* — Benedict E Lee
(74) *Attorney, Agent, or Firm* — Astute IP Law Group

(57) ABSTRACT

A method and a device for data processing. The method is adapted to a generative adversarial network obtained by model distillation, and the generative adversarial network includes a first generator, a second generator and a discriminator. The model distillation is a process of alternately training the first generator and the second generator. A model scale of the first generator is smaller than a model scale of the second generator. The method includes: obtaining an image to be processed; and processing the image with a first generator to obtain a processed image.

18 Claims, 4 Drawing Sheets

(56) References Cited

U.S. PATENT DOCUMENTS

| | | | | |
|---|---|---|---|---|
| 11,514,307 | B2 * | 11/2022 | Kawaguchi | G06N 3/084 |
| 11,610,435 | B2 * | 3/2023 | Karras | G06V 40/166 |
| 2019/0295223 | A1 * | 9/2019 | Shen | G06N 3/045 |

FOREIGN PATENT DOCUMENTS

| | | | | | |
|---|---|---|---|---|---|
| CN | 110769619 | A | * | 2/2020 | H05K 3/46 |
| CN | 111709408 | A | * | 9/2020 | G06F 18/214 |
| CN | 111967573 | A | | 11/2020 | |
| CN | 112052948 | A | | 12/2020 | |
| CN | 112258381 | A | * | 1/2021 | G06N 3/045 |
| CN | 112465111 | A | | 3/2021 | |
| CN | 112686275 | A | * | 4/2021 | |
| CN | 113065635 | A | | 7/2021 | |
| CN | 113095475 | A | | 7/2021 | |
| CN | 113112020 | A | * | 7/2021 | G06N 5/022 |
| CN | 113449851 | A | | 9/2021 | |
| CN | 115374899 | A | * | 11/2022 | G06V 10/82 |
| TW | I772805 | B | * | 8/2022 | G06N 3/088 |
| WO | WO-2021056969 | A1 | * | 4/2021 | G06F 18/214 |

OTHER PUBLICATIONS

Li, Zheng, et al. "Online knowledge distillation via multi-branch diversity enhancement." Proceedings of the Asian conference on computer vision. 2020. (Year: 2020).*

Extended European Search Report for European Patent Application No. 22841056.9, mailed on Sep. 19, 2024, 9 pages.

Jin et al., "Teachers Do More Than Teach: Compressing Image-to-Image Models", arXiv, Mar. 5, 2021, 18 pages.

International Search Report (with English translation) and Written Opinion issued in PCT/CN2022/094556, dated Aug. 23, 2022, 11 pages provided.

Office Action issued in Chinese Application No. 202110802048.4, mailed Nov. 15, 2022, with English translation.

Ren et al., "Online Multi-Granularity Distillation for GAN Compression", IEEE, Mar. 1, 2022.

Chen et al., "Distilling portable Generative Adversarial Networks for Image Translation", arXiv:2003.03519v1, Mar. 7, 2020.

* cited by examiner

METHOD AND DEVICE FOR DATA PROCESSING

CROSS-REFERENCE TO RELATED APPLICATION(S)

This application claims the benefit of Chinese Patent Application No. 202110802048.4 filed on Jul. 15, 2021, entitled "METHOD AND DEVICE FOR DATA PROCESSING", which is hereby incorporated by reference in its entirety.

FIELD

The embodiments of the present disclosure relate to the field of computer and network communication and in particular, to a method and a device for data processing.

BACKGROUND

Currently, with the advancement of hardware technology and business development, deploying deep learning networks on lightweight devices (e.g., cell phones, smart wearable devices, etc.) has gradually become one of the trends in the development of deep learning networks. Given that deep learning networks usually have a more complex network structure and are computationally intensive, model compression is required for deep learning networks before being deployed on the lightweight devices.

At present, model compression for deep learning networks is to formulate a model compression process for deep learning networks as a multi-stage task, which comprises multiple operations, such as, network structure search, distillation, pruning, quantization, etc. In deploying Generative Adversarial Networks (GANs) on the lightweight devices, if the model compression of GANs is implemented by using the above model compression process, this would result in high time cost of model compression and high requirement of computational resources.

SUMMARY

The embodiments of the present disclosure provide a method and device for data processing to improve the model compression efficiency of a generative adversarial network and enable processing of images through the generative adversarial network on a lightweight device.

In a first aspect, the embodiments of the present disclosure provide a method for data processing adapted to a generative adversarial network obtained by model distillation. The method for data processing comprises:

obtaining an image to be processed; and processing the image with a first generator to obtain a processed image;

wherein the generative adversarial network comprises the first generator, a second generator and a discriminator, the model distillation is a process of alternately training the first generator and the second generator, and a model scale of the first generator is smaller than a model scale of the second generator.

In a second aspect, the embodiments of the present disclosure provide a device for data processing adapted to a generative adversarial network obtained by model distillation. The device for data processing comprises:

an obtaining module configured for obtaining an image to be processed; and a processing module configured for processing the image with a first generator to obtain a processed image;

wherein the generative adversarial network comprises the first generator, a second generator and a discriminator, the model distillation is a process of alternately training the first generator and the second generator, and a model scale of the first generator is smaller than a model scale of the second generator.

In a third aspect, the embodiments of the present disclosure provide an electronic device comprising at least one processor and a memory:

the memory stores computer-executable instructions;

the computer-executable instructions stored in the memory which, when executed by the at least one processor, cause the at least one processor to carry out the method for data processing as described in the above first aspect and various possible designs of the first aspect.

In a fourth aspect, the embodiments of the present disclosure provide a computer-readable storage medium. The computer-readable storage medium stores computer-executable instructions which, when executed by a processor, carry out the method for data processing as described in the above first aspect and various possible designs of the first aspect.

In a fifth aspect, the embodiments of the present disclosure provide a computer program product. The computer program product comprises computer-executable instructions which, when executed by a processor, carry out the method for data processing as described in the above first aspect and various possible designs of the first aspect.

In a sixth aspect, the embodiments of the present disclosure provide a computer program. The computer program comprises computer-executable instructions which, when executed by a processor, carry out the method for data processing as described in the above first aspect and various possible designs of the first aspect.

In the method and device for data processing provided by the embodiments of the present disclosure, the generative adversarial network comprises a first generator, a second generator, and a discriminator, a model scale of the first generator is smaller than a model scale of the second generator, the first generator and the second generator in the generative adversarial network are alternately trained in a model distillation process, and during each training process, and the training of the first generator is guided by the optimized second generator. The image to be processed is processed with the first generator obtained by model distillation.

Therefore, in this embodiment, on the one hand, the multi-stage model compression process is discarded, and only the model distillation stage is achieved for model compression, thereby reducing the complexity of model compression and improving the model compression efficiency: on the other hand, the online distillation approach of alternating training the first and second generators during the model distillation process enhances the model training effect of the first generator and improves the quality of the images processed by the first generator. The final first generator can adapt to lightweight devices with poor computing capability in terms of model scale, and the quality of the processed image can be ensured by the first generator.

BRIEF DESCRIPTION OF THE DRAWINGS

In order to more clearly illustrate the technical solutions in the embodiments of the present disclosure or in the prior art, the accompanying drawings that need to be used in the description of the embodiments or the prior art will be briefly introduced below. It will be apparent to a person of ordinary skill in the art that other accompanying drawings can be acquired based on these accompanying drawings without creative efforts.

DETAILED DESCRIPTION

In order to make the objectives, technical solutions and advantages of the embodiments of the present disclosure clearer, the technical solutions in the embodiments of the present disclosure will be fully and clearly described in the following in conjunction with the accompanying drawings in the embodiments of the present disclosure. It is apparent that the described embodiments are a part of the embodiments of the present disclosure, and not all of the embodiments. Based on the embodiments in the present disclosure, all other embodiments acquired by a person of ordinary skill in the art without making creative efforts fall within the scope of protection of the present disclosure.

Figure 1:
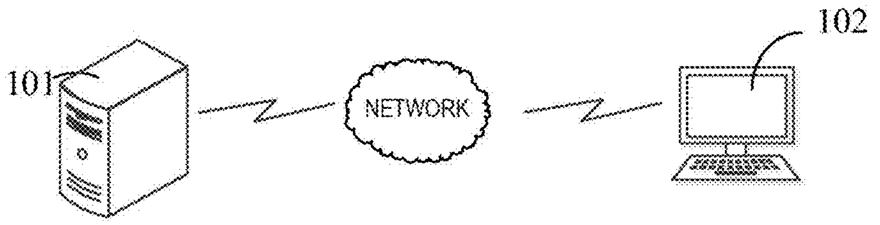
FIG. 1 shows a schematic diagram of an application scenario provided by the embodiments of the present disclosure.

Referring to FIG. 1, which shows a schematic diagram of an application scenario provided by the embodiments of the present disclosure.

The application scenario shown in FIG. 1 is a image processing scenario. The devices involved in the image processing scenario comprise a terminal 101 and a server 102, and the terminal 101 communicates with the server 102, for example, via a network. The server 102 is used for training a deep learning model and deploying the trained deep learning model to the terminal 101. The terminal 101 performs image processing with the deep learning model.

The deep learning model is Generative Adversarial Networks (GANs). The server 102 deploys the trained generators in the generative adversarial network to the terminal.

The terminal 101 is a lightweight device (e.g., a camera, a cell phone, a smart home appliance) with a weak computing capability, which is suitable for deploying deep learning models of a smaller scale. Therefore, how to obtain a smaller scale generator adapted to be deployed on lightweight devices and improve the image processing effect of the smaller scale generator is one of the problems to be solved at present.

Model compression is one of the ways to train deep learning models of a small model scale. However, current model compression approaches for generative adversarial networks still suffer from the following shortcomings:

1) mature model compression techniques in the field of deep learning are not customized for generative adversarial networks and lack exploration of the complex characteristics and structure of generative adversarial networks: 2) the model compression process comprises multiple stages, such as, network structure search, distillation, pruning, quantization, etc., which requires high time requirements and computational resources: 3) the compressed generative adversarial networks consume higher computational resources, and are difficult to apply to lightweight devices.

In order to solve the above problems, the embodiments of the present disclosure provide a method for data processing. In the method, a model compression approach suitable for generative adversarial networks is designed, in which one-step compression of generative adversarial networks is implemented by model distillation, which reduces the complexity of model compression and improves the efficiency of model compression. In the process of model distillation, by the on-line distillation approach in which the generators of a small scale and the generators of a large scale are alternately trained, the training effect of the generators of the small scale is improved. Finally, the generators of a small scale is obtained that can be adapted to lightweight devices with a better quality of the processed images.

By way of example, the method for data processing provided by the embodiments of the present disclosure can be applied in terminals or servers. In case of applying the method in a terminal, real-time processing of images captured by the terminal can be realized. In case of applying the method in a server, the processing of images sent by the terminal can be realized. The terminal device may be a personal digital assistant (PDA) device, a handheld device with a wireless communication function (e.g., a smartphone, a tablet, etc.), a computing device (e.g., a personal computer (PC)), a vehicle-mounted device, a wearable device (e.g., a smart watch, a smart band, etc.), and smart home appliances (e.g., a smart display device, etc.).

Figure 2:
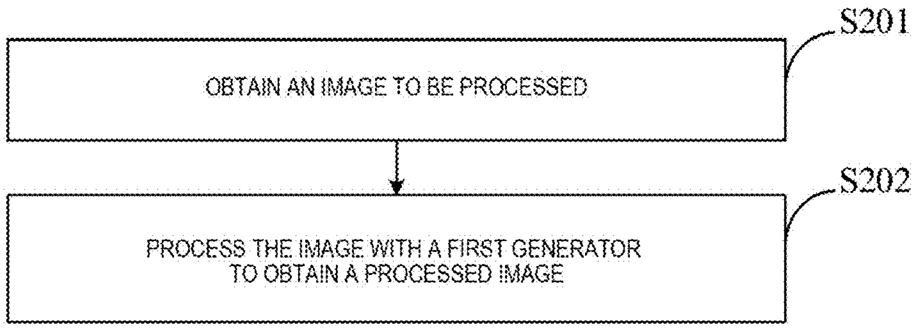
FIG. 2 shows a flowchart of a method for data processing provided by the embodiments of the present disclosure.

Referring to FIG. 2, FIG. 2 shows a flowchart of a method for data processing provided by the embodiments of the present disclosure.

S201. obtaining an image to be processed.

In an example, the image to be processed may be an image captured by the terminal in real time, or one or more frames obtained from a video captured by the terminal in real time.

In another example, the image to be processed may be an image input or selected by a user. For example, the user inputs or selects the image to be processed or detected on a display interface of the terminal. Alternatively, the server receives the image transmitted from the terminal that is input or selected by the user.

In yet another example, the image to be processed may be an image played in real time on the terminal. For example, when detecting that an image or video playback, the terminal obtains an image or a video frame that is being played. Thus, processing of the image played in real time on the terminal is implemented.

In still another example, the image to be processed may be an image in a database that is pre-stored in the terminal and/or the server. For example, a database storing a plurality of images to be processed is pre-established in the terminal, and the image to be processed is obtained from the database when image processing is performed.

S202. processing the image with a first generator to obtain a processed image.

The generative adversarial network comprises the first generator, a second generator and a discriminator. A model scale of the first generator is smaller than a model scale of the second generator. Thus, compared to the first generator, the second generator has a stronger image processing capability, and thus can extract more detailed features of the image, and process to obtain a higher quality image, and the image processing process requires more computing resources.

In a training process of the generative adversarial network, the generative adversarial network is trained by utilizing the model distillation approach. In the model distillation process, the first generator and the second generator are alternately trained. That is, the first generator and the second generator are distilled online in order to use the optimized second generator to guide the optimization of the first generator, so that the first generator, which has a smaller model scale than the second generator, can approximate the second generator in terms of the quality of image processing.

The training process of the generative adversarial network may be performed on the server. Considering that the computing capability of the terminal is weak, the first generator with a smaller model scale that is obtained by model distillation may be deployed at the terminal.

In this step, during the image processing process, the image to be processed is directly input into the first generator, or the image to be processed is processed by preprocessing operations, such as, clipping, denoising, enhancement, and so on, then input into the first generator to obtain the processed image outputted by the first generator.

In the embodiments of the present disclosure, model compression of the generative adversarial network is implemented by means of online distillation of the first generator and the second generator, which improves the efficiency and effect of model compression, and obtains the first generator with a smaller model scale and higher quality of image processing, which is particularly suitable for deployment on lightweight devices for image processing, and improves the efficiency and quality of image processing on the lightweight devices.

It is to be noted that, the training process of the generative adversarial network is performed separately from the process of applying the generative adversarial network to image processing, e.g., after the generative adversarial network is trained on the server, the trained student generator is deployed on the terminal, and image processing is performed with the student generator. Each time the server updates the generative adversarial network, the student generator may be redeployed on the terminal.

In the following, the training process of the generative adversarial network is described in the embodiments.

Figure 3:
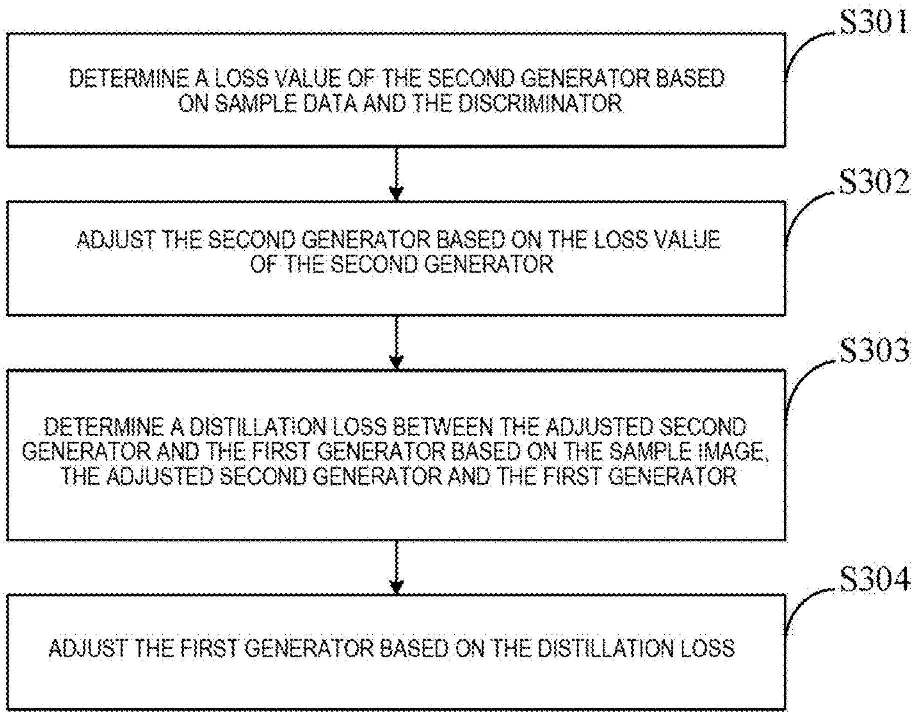
FIG. 3 shows a first flow diagram of a training process of a generative adversarial network in the method for data processing provided by the embodiments of the present disclosure.

Referring to FIG. 3, which shows a first flow diagram of a training process of a generative adversarial network in the method for data processing provided by the embodiments of the present disclosure, i.e., a flow diagram of an alternately training process of the first generator and the second generator in the generative adversarial network. As shown in FIG. 3, the alternately training process of the first generator and the second generator in the generative adversarial network comprises:

S301: determining a loss value of the second generator based on sample data and the discriminator.

The sample data comprises a sample image and a reference image corresponding to the sample image. For example, in image depth estimation, the sample data comprises the sample image and the true depth map of the sample image: in face recognition of images, the sample image comprises the sample image and the true face marked image of the sample image. For example, a position of each face may be manually marked in the face marked image.

In this step, the sample image is processed with the second generator to obtain a processed sample image output by the second generator, which is referred to as the output image of the second generator hereinafter for brevity of description. The true or false discrimination is performed between the reference image corresponding to the sample image and the output image of the second generator by the discriminator to determine an adversarial loss of the second generator. In the training process, the second generator makes its own output image approximate the reference image corresponding to the sample image, and the discriminator tries to distinguish between the output image of the second generator and the reference image corresponding to the sample image, and the adversarial loss of the second generator reflects a loss value of the true or false discrimination between the reference image corresponding to the sample image and the output image of the second generator by the discriminator.

In the process of discriminating the reference image corresponding to the sample image and the output image of the second generator by the discriminator, the reference image corresponding to the sample image is input into the discriminator, and the output image of the second generator is input into the discriminator. The discriminator determines whether the reference image corresponding to the sample image and the output image of the second generator are from the sample data, respectively. Finally, an adversarial loss of a teacher generator is calculated based on the output of the discriminator when the reference image corresponding to the sample image is input into the discriminator, the output of the discriminator when the output image of the second generator is input into the discriminator, and a adversarial loss function.

Optionally, in the case where the output of the discriminator is 1 indicating that the input data of the discriminator is from the sample data, and the output of the discriminator is 0 indicating that the input data of the discriminator is not from the sample data, the expectation outputted by the discriminator when the reference image corresponding to the sample image is input into the discriminator is determined, the expectation of a difference obtained by subtracting the output of the second generator when the output image of the second generator is input into the discriminator from 1 is determined, and the two expectations are summed to obtain the adversarial loss of the second generator.

Further, the adversarial loss function for calculating the adversarial loss of the second generator is expressed as:

$$L_{GAN}(G_T, D) = E_{\{x,y\}}[\log D(x, y)] + E_{\{x\}}[\log(1 - D(x, G_T(x)))]$$

where $L_{GAN}(G_T, D)$ denotes the adversarial loss function, Gr denotes the second generator, D denotes the discriminator, x denotes the sample image, y denotes the reference image corresponding to the sample image, $G_T(x)$ denotes the output image of the second generator after the sample image x is input into the second generator, $E_{\{x,y\}}[\ ]$ denotes the expectation function under the sample data {x,y}, $E_{\{x\}}[\ ]$ denotes the expectation function under the sample data x.

In some embodiments, the loss value of the second generator is determined to be the adversarial loss of the second generator. That is, the adversarial loss obtained from the above calculation is directly used as the loss value of the second generator.

In some implementations, in addition to the adversarial loss, the loss value of the second generator comprises a reconstruction loss of the second generator. In this case, a possible implementation of S301 comprises: processing the sample image with the second generator to obtain an output image of the second generator: performing, with the discriminator, a true or false discrimination between the reference image corresponding to the sample image and the output image of the second generator to determine an adversarial loss of the second generator; and determining the loss value of the second generator based on a difference between the reference image corresponding to the sample image and the output image of the second generator. In this way, in the loss value of the second generator, both the adversarial loss determined from the image discrimination by the discriminator and the reconstruction loss that reflects the difference between the reference image corresponding to the sample image and the output image of the second generator are taken into account, which improves the comprehensiveness and accuracy of the loss value of the second generator, and thereby improving the training effect of the second generator.

Optionally, in the reconstruction loss function, the difference between the reference image corresponding to the sample image and the output image of the second generator is determined, and based on the difference, the reconstruction loss of the second generator is calculated.

Further, the reconstruction loss function for calculating the reconstruction loss of the second generator is expressed as:

$$L_{recon}(G_T, D) = E_{\{x,y\}}[y - G_T(x)]$$

where $L_{recon}(G_T, D)$ denotes the reconstruction loss function of the second generator, $y-G_T(x)$ denotes the difference between the reference image corresponding to the sample image and the output image of the second generator.

S302: adjusting the second generator based on the loss value of the second generator.

In this step, after obtaining the loss value of the second generator, the second generator may be adjusted based on an optimization objective function to complete a training of the second generator. Herein, the optimization objective function, for example, is a function that maximizes the loss value or a function that minimizes the loss value, and an optimization algorithm utilized in the adjustment process of the second generator, for example, is a gradient descent algorithm. There is no limitation on the optimization algorithm herein.

In some embodiments, in the case where the loss value of the second generator comprises the adversarial loss of the second generator, the optimization objective function comprises maximizing the adversarial loss on the basis of the discriminator and minimizing that adversarial loss on the basis of the teacher generator. In other words, in this optimization objective function, the optimization direction for the discriminator is to maximize the adversarial loss to improve the discriminative capability of the discriminator: the optimization objective for the second generator is to minimize the adversarial loss to approximate the reference image corresponding to the sample image by the output image of the second generator, such that the discriminator discriminates that the output image of the second generator is from the sample data.

In some embodiments, in the case where the loss value of the second generator comprises the reconstruction loss of the second generator, the optimization objective function comprises minimizing the reconstruction loss on the basis of the second generator, i.e., to minimize the reconstruction loss by adjusting the second generator, which causes the output image of the second generator to approximate the reference image corresponding to the sample image, and improves the image quality of the output image of the second generator.

Optionally, in the case where the loss value of the second generator comprises the adversarial loss of the second generator and the reconstruction loss of the second generator, the optimization objective function of the second generator is expressed as:

$$G_T^* = \arg\min_{G_T}\max_{D} L_{GAN}(G_T, D) + L_{recon}(G_T, D)$$

where $$G_T^*$$

denotes the optimization objective function in the training process of the second generator, $$\max_{D} L_{GAN}(G_T, D)$$

donates maximizing the discriminative loss by adjusting the discriminator.

S303: determining a distillation loss between the adjusted second generator and the first generator based on the sample image, the adjusted second generator and the first generator.

In this step, the sample image is processed with the adjusted second generator, and the sample image is processed with the first generator. Since the model scale of the second generator is larger than the model scale of the first generator, there are differences between the data obtained by processing the sample image with the adjusted second generator and the data obtained by processing the sample image with the first generator. The distillation loss between the adjusted second generator and the first generator is determined based on these differences.

Embodiments of the distillation loss and a process for determining the distillation loss are provided below In some embodiments, the distillation loss between the adjusted second generator and the first generator comprises an output distillation loss between the adjusted second generator and the first generator. In the generative adversarial network, the network layer comprises an input layer, an intermediate layer, and an output layer. The output distillation loss is a distillation loss between the output layer of the second generator and the output layer of the first generator, which reflects the difference between the output image of the second generator and the output image of the first generator. In this case, a possible implementation of S303 comprises: processing the sample image with the first generator and the adjusted second generator respectively, to obtain an output image of the first generator and an output image of the second generator: determining the output distillation loss based on the difference between the output image of the first generator and the output image of the second generator.

The difference between the output image of the first generator and the output image of the second generator may be obtained by comparing the output image of the first generator with the output image of the second generator. For example, individual pixels in the output image of the first generator are compared with pixels at corresponding positions in the output image of the second generator: for another example, the output image of the first generator is compared with the output image of the second generator in terms of image brightness, contrast, and the like.

Accordingly, the optimization of the first generator is guided by the output distillation loss reflecting the difference between the output image of the first generator and the output image of the second generator, and with the optimization of the first generator, the output image of the first generator is gradually approximated to the output image of the adjusted second generator, which facilitates the improvement of the image quality of the image processed by the first generator.

For the output distillation loss:

In an example, the output distillation loss comprises a structural similarity loss and/or a perceptual loss between the output image of the first generator and the output image of the second generator.

The structural similarity loss is similar to the observation of images by a Human Visual System (HVS), which focuses on a local structural difference between the output image of the first generator and the output image of the second generator, including the differences in terms of image brightness, contrast, etc. The perceptual loss focuses on a difference between the output image of the first generator and the output image of the second generator in terms of feature representation.

Specifically, the structural similarity loss between the output image of the second generator and the output image of the first generator may be determined based on a brightness and contrast of the output image of the second generator and a brightness and contrast of the output image of the first generator. For example, the structural similarity loss is obtained by comparing the differences between the output image of the second generator and the output image of the first generator in terms of image brightness and contrast respectively; and/or the perceptual loss between the output image of the first generator and the output image of the second generator is determined by performing feature extraction on the output image of the first generator and the output image of the second generator with a feature extraction network, respectively. For example, the perceptual loss is obtained by comparing the features extracted from the output image of the first generator with the features extracted from the output image of the second generator.

The output distillation loss is determined based on the structural similarity loss and/or the perceptual loss. For example, the output distillation loss is determined to be the structural similarity loss, or the output distillation loss is determined to be the perceptual loss, or the output distillation loss is obtained by determining a weighted sum of the structural similarity loss and the perceptual loss.

Thereby, the differences between the output image of the first generator and the output image of the second generator are determined from the structural similarity loss and/or the perceptual loss in terms of one or more aspects, such as, human vision, feature representation and the like, which improves the comprehensiveness and accuracy of the output distillation loss, and improves the training effect of the first generator.

Optionally, the process of determining the structural similarity loss comprises: determining a brightness estimate of the output image of the second generator, a brightness estimate of the output image of the first generator, a contrast estimate of the output image of the second generator, a contrast estimate of the output image of the first generator, and a structural similarity estimate between the output image of the second generator and the output image of the first generator: determining the structural similarity loss between the output image of the first generator and the output image of the second generator based on these parameters.

Specifically, a pixel mean and a pixel standard deviation of the output image of the second generator are calculated, a pixel mean and a pixel standard deviation of the output image of the first generator are calculated, and a covariance between the pixels of the output image of the second generator and the pixels of the output image of the first generator is calculated. For the second generator, the brightness estimate and the contrast estimate of its output image are determined as the pixel mean and the pixel standard deviation of its output image, respectively. Similarly, for the first generator, the brightness estimate and the contrast estimate of its output image are determined as the pixel mean and the pixel standard deviation of its output image, respectively. A structural similarity estimate between the output image of the second generator and the output image of the first generator is determined as the covariance between the pixels of the output image of the second generator and the pixels of the output image of the first generator.

Further, the structural similarity loss function for calculating the structural similarity is expressed as:

$$L_{SSIM}(p_t, p_s) = \frac{(2\mu_t\mu_s + C_1)(2\sigma_{ts} + C_2)}{(\mu_t^2\mu_s^2 + C_1)(\sigma_t^2 + \sigma_s^2 + C_2)}$$

where $L_{SSIM}(p_t, p_s)$ denotes the structural similarity loss function, $p_t$ and $p_s$ denote the output image of the second generator and the output image of the first generator respectively, $\mu_t$ and $\mu_s$ denote the brightness estimate of the output image of the second generator and the brightness estimate of the output image of the first generator respectively, $$\sigma_t^2 \text{ and } \sigma_s^2$$

denote the contrast estimate of the output image of the second generator and the contrast estimate of the output image of the first generator respectively, and $\sigma_{ts}$ denote the structural similarity estimate between the output image of the second generator and the output image of the first generator.

Optionally, the process of determining the perceptual loss comprises: inputting the output image of the first generator and the output image of the second generator into the feature extraction network respectively, to obtain a feature of the output image of the first generator and a feature of the output image of the second generator output by a predetermined network layer of the feature extraction network; and determining a feature reconstruction loss and/or a style reconstruction loss based on a difference between the feature of the output image of the first generator and the feature of the output image of the second generator.

The perceptual loss comprises the feature reconstruction loss and/or the style reconstruction loss. The feature reconstruction loss is used to reflect the difference between a relatively underlying (or relatively concrete) feature representation of the output image of the first generator and a relatively underlying feature representation the output image of the second generator, for encouraging the output image of the first generator and the output image of the second generator to have similar feature representations: the style reconstruction loss is used to reflect the difference between a relatively abstract style feature (e.g., color, texture, pattern) of the output image of the first generator and a relatively abstract style feature of the output image of the second generator, for encouraging the output image of the first and the output image of the second generator to have similar style features.

Specifically, different abstract levels of features are extracted based on different network layers of the same feature extraction network: obtaining the feature of the output image of the first generator and the feature of the output image of the second generator extracted by a network layer for extracting an underlying feature, determining the feature reconstruction loss based on a difference between the feature of the output image of the first generator and the feature of the output image of the second generator: obtaining the feature of the output image of the first generator and the feature of the output image of the second generator extracted by a network layer for extracting an abstract feature: determining a style reconstruction loss based on a difference between the feature of the output image of the first generator and the feature of the output image of the second generator.

Alternatively, the extraction of image features may be implemented with different feature extraction networks, wherein one feature extraction network is skilled in extracting underlying feature representations and the other feature extraction network is skilled in extracting abstract style features. Based on the features of the output image of the first generator and the features of the second generator extracted by the different feature extraction networks, the feature reconstruction loss and the style reconstruction loss are determined, respectively.

Optionally, the feature extraction network is a Visual Geometry Group (VGG) network. In particular, the VGG network is a deep convolutional neural network that may be used to extract the features of the output image of the first generator and the features of the second generator. Thereby, features with different abstraction levels in the output image of the first generator and the output image of the second generator may be obtained from different network layers of the same VGG network or from different network layers of different VGG networks.

Further, the feature reconstruction loss function for calculating the feature reconstruction loss is expressed as:

$$L_{fea}(p_t, p_s) = \frac{1}{C_j H_j W_j} \|\phi_j(p_t) - \phi_j(p_s)\|_1$$

where $L_{fea}(p_t, p_s)$ denotes the feature loss function for calculating the feature reconstruction loss between the output image $p_t$ of the second generator and the output image $p_s$ of the first generator, $\phi_j(p_t)$ denotes a feature activation value (i.e., feature) of the output image of the second generator extracted by the j-th layer of the VGG network $\phi$, and $\phi_j(p_s)$ denotes a feature activation value of the output image of the first generator extracted by the j-th layer of the VGG network $\phi$. $C_j \times H_j \times W_j$ denotes the dimensionality of the feature activation value outputted from the j-th layer of the VGG network $\phi$.

Further, the style reconstruction loss function for calculating the style reconstruction loss is expressed as:

$$L_{style}(p_t, p_s) = \left\|G_j^{\phi}(p_t) - G_j^{\phi}(p_s)\right\|_1$$

where $L_{style}(p_t, p_s)$ denotes the style loss function for calculating the style reconstruction loss between the output image $p_t$ of the second generator and the output image $p_s$ of the first generator, $$G_j^{\phi}(p_t)$$

denotes a Gram matrix of a feature activation value of the output image of the second generator extracted by the j-th layer of the VGG network $\phi$, and $$G_j^{\phi}(p_s)$$

denotes a Gram matrix of a feature activation value of the output image of the first generator extracted by the j-th layer of the VGG network $\phi$.

S304: adjusting the first generator based on the distillation loss.

In this step, after the distillation loss between the first generator and the second generator, the distillation loss is back-propagated, and the model parameters of the first generator are adjusted during the back-propagation process so that the learning generator is optimized in the direction of minimizing the distillation loss.

In an example, the distillation loss comprises the output distillation loss. The output distillation loss is back-propagated, and the model parameters of the first generator are adjusted during the back-propagation process so that the learning generator is optimized in the direction of minimizing the output distillation loss. The concept of the output distillation loss and the process of determining the output distillation loss may refer to the description of the steps previously described, and thus will not be repeated herein.

In another example, in addition to the distillation loss, the online loss of the first generator with respect to the second generator further comprises a total variation loss of the output image of the first generator. In particular, the total variation loss of the output image of the first generator is used to reflect a spatial smoothness of the output image of the first generator, and by optimizing the first generator with the total variation loss, the spatial smoothness of the output image of the first generator can be enhanced and the image quality can be improved.

In the case where the online loss of the first generator comprises the distillation loss between the first generator and the second generator and the total variation loss of the output image of the first generator, a possible implementation of S304 comprises: determining a weighted sum of the distillation loss and the total variation loss to obtain an online loss of the first generator; and adjusting the first generator based on the online loss of the first generator. The weights corresponding to the distillation loss and the total variation loss respectively may be determined by a professional based on experience and an experimental process.

Thereby, in the training process of the first generator, by combining the distillation loss and the total variation loss, both the data differences in image processing between the first generator and the second generator and the image noise outputted by the first generator are taken into account, and the distillation loss and the total variation loss are balanced by weighting the distillation loss and the total variation loss, which facilitates to improve the training effect of the first generator.

Further, in the case where the distillation loss comprises the output distillation loss, the output distillation loss comprises a structural similarity loss and a perceptual loss between the output image of the first generator and the output image of the second generator, and in the case where the perceptual loss comprises the feature reconstruction loss and the style reconstruction loss between the output image of the first generator and the output image of the second generator, the on-line distillation loss function for calculating the on-line loss of the first generator is expressed as:

$$L_{kd}(p_t, p_s) = \lambda_{ssim}L_{ssim} + \lambda_{fea}L_{fea} + \lambda_{style}L_{style} + \lambda_{tv}L_{tv}$$

where $L_{kd}(p_t, p_s)$ denotes the loss function of the first generator, $\lambda_{ssim}$, $\lambda_{fea}$; $\lambda_{style}$, $\lambda_{tv}$ denote a weight corresponding to the structural similarity loss $L_{ssim}$, a weight corresponding to the feature reconstruction loss $L_{fea}$, a weight corresponding to the style reconstruction loss $L_{style}$, and a weight corresponding to the total variation loss $L_{tv}$, respectively.

In summary, in this embodiment, the second generator and the first generator are distilled online, i.e., the second generator and the first generator are trained synchronously. During each training process, the first generator is optimized with only the adjusted second generator in the current training count. On the one hand, the first generator is implemented to be trained in an environment with a discriminator, and at the same time, the first generator does not need to be tightly bound to the discriminator, so that the first generator can be trained more flexibly and obtain further compression: on the other hand, the optimization of the first generator does not need true labels, and the first generator only learns the outputs of the second generator that has a similar structure and a larger model scale, which effectively reduces the difficulty of the first generator to fit true labels.

In some embodiments, the first generator is a student generator, and the second generator is a teacher generator. The student generator and the teacher generator have a similar model structure, the model scale and complexity of the teacher generator are larger than the model scale and complexity of the student generator, and compared to the student generator, the teacher generator has a stronger learning capability and is able to better guide the training of the student generator during the distillation process.

In some embodiments, the teacher generator comprises a first teacher generator and a second teacher generator, wherein a model capacity of the first teacher generator is larger than a model capacity of the student generator, and a model depth of the second teacher generator is greater than a model depth of the student generator.

Thus, two different teacher generators are provided for the student generator from two complementary dimensions, which can provide a complementary full range of distillation loss for the student generator model during the model distillation process as follows: the first teacher generator compensates the student generator in terms of model capacity (i.e., the model width, also referred to as the number of channels of the model) to capture more detailed image information that the student generator cannot capture: the second model generator compensates the student generator in terms of the model depth to achieve better image quality. In addition to the above distinctions, the student generator is similar to the first teacher generator and the second teacher generator in terms of the overall model structure, which consists of a deep learning model that includes multiple network layers.

Optionally, the number of channels of the intermediate layer of the first teacher generator is a multiple of the number of channels of the intermediate layer of the student generator, wherein the multiple is greater than 1. Thereby, the relationship between the first teacher generator and the student generator is succinctly established by the multiplicative relationship, which facilitates the calculation of the channel distillation loss in subsequent embodiments.

Optionally, the number of the network layers of the second teacher generator is more than the number of network layers of the student generator.

Optionally, in constructing the second teacher generator, one or more network layers are added before each up-sampled network layer and each down-sampled network layer of the student generator to obtain the second teacher generator.

Optionally, in constructing the second teacher generator, a Deep residual network (Resnet) is added before each up-sampled network layer and each down-sampled network layer of the student generator to obtain the second teacher generator. Thereby, by adding the mature Resnet, the training efficiency of the second teacher generator is improved and the training difficulty of the second teacher generator with larger model depth is reduced.

In an example, during a training process of a generative adversarial network, the loss value of the first teacher generator may be determined based on the sample data and the discriminator, the sample data comprising a sample image and a reference image of the sample image: the first teacher generator is adjusted based on the loss value of the first teacher generator: the loss value of the second teacher generator is determined based on the sample data and the discriminator: the second teacher generator is adjusted based on the loss value of the second teacher generator: the student generator is adjusted based on the sample image, the adjusted first teacher generator, and the adjusted second teacher generator.

The adjustment of the first teacher generator and the adjustment of the second teacher generator may refer to the adjustment of the second generator in the preceding embodiments. Unlike the preceding embodiments, in adjusting the student generator, it needs to determine the distillation loss between the first teacher generator and the student generator and the distillation loss between the second teacher generator and the student generator, and the student generator is adjusted based on the distillation loss between the first teacher generator and the student generator and the distillation loss between the second teacher generator and the student generator. Similarly, the process of determining the distillation loss between the first teacher generator and the student generator, and the process of determining the distillation loss between the second teacher generator and the student generator may refer to the process of determining the distillation loss between the second generator and the first generator in the preceding embodiments, and will not be repeated herein.

In some embodiments, the discriminator comprises a first discriminator and a second discriminator, and a shared convolutional layer is between the first discriminator and the second discriminator. In the training process of the generative adversarial network, the first teacher generator utilizes the first discriminator, and the second teacher generator utilizes the second discriminator. Thereby, taking into full consideration that the model structures of the first teacher generator and the second teacher generator are similar but not identical, the first discriminator and the second discriminator, which are partially shared by the convolutional layer, are used to train the first teacher generator and the second teacher generator, respectively, which improve the model training effect and efficiency.

Figure 4:
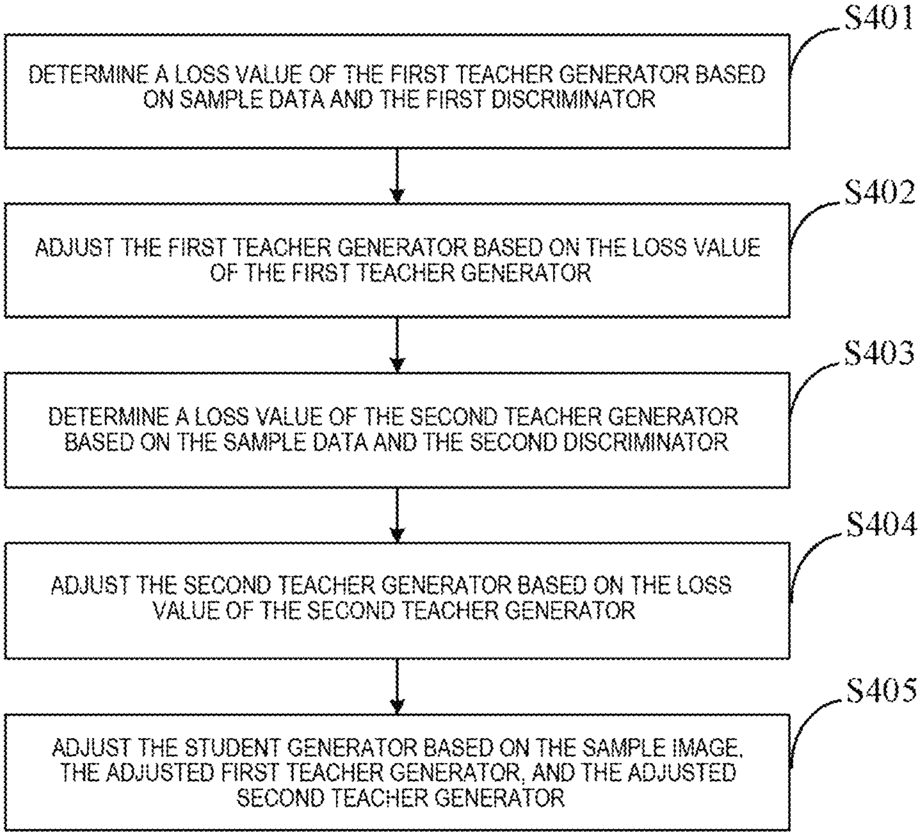
FIG. 4 shows a second flow diagram of a training process of a generative adversarial network in the method for data processing provided by the embodiments of the present disclosure.

Referring to FIG. 4, which shows a second flow diagram of a training process of a generative adversarial network in the method for data processing provided by the embodiments of the present disclosure, i.e., a flow diagram of an alternately training process of the student generator, the first teacher generator and the second teacher generator in the generative adversarial network.

As shown in FIG. 4, the alternately training process of the student generator, the first teacher generator and the second teacher generator in the generative adversarial network comprises:

S401. determining a loss value of the first teacher generator based on sample data and the first discriminator.

The implementation principle and technical effect of S401 may refer to the description of determining the loss value of the second generator based on the sample image and the discriminator in the preceding embodiments, and will not be repeated herein.

Optionally, the loss value of the first teacher generator comprises an adversarial loss of the first teacher generator. In this case, the adversarial loss function for calculating the adversarial loss of the first teacher generator may be expressed as:

$$L_{GAN}^{W}(G_T^W, D1) = E_{x,y}[\log D1(x, y)] + E_x[\log(1 - D1(x, G_T^W(x)))]$$

where $$L_{GAN}^{W}(G_T^W, D1)$$

denotes the adversarial loss function of the first teacher generator, $$G_T^W$$

denotes the first teacher generator, $$G_T^W(x)$$

denotes the output image of the first teacher generator after the sample image x is input into the first teacher generator, and D1 denotes the first discriminator.

Optionally, the loss value of the first teacher generator further comprises the reconstruction loss of the first teacher generator. In this case, the reconstruction loss function for calculating the reconstruction loss of the first teacher generator may be expressed as:

$$L_{recon}^{w}(G_T^W, D1) = E_{(x,y)}[y - G_T^W(x)]$$

where $$L_{recon}^{W}(G_T^W, D1)$$

denotes the reconstruction loss function of the first teacher generator, $$L_{recon}^{W}(G_T^W, D1)$$

denotes the difference between the reference image corresponding to the sample image and the output image of the first teacher generator.

S402. adjusting the first generator based on the loss value of the first teacher generator.

The implementation principle and technical effect of S402 may refer to the description of adjusting the second generator based on the loss value of the second generator in the preceding embodiments, and will not be repeated herein.

Optionally, in the case where the loss value of the first teacher generator comprises the adversarial loss of the first teacher generator and the reconstruction loss of the first teacher generator, the optimization objective function of the first teacher generator is expressed as:

$$G_T^{W*} = \arg\min_{G_T}\max_{D} L_{GAN}(G_T^W, D1) + L_{recon}(G_T^W, D1)$$

where $$G_T^{W*}$$

denotes the optimization objective function in the training process of the first teacher generator, and $$\max_{D} L_{GAN}(G_T^W, D1)$$

denotes maximizing the discriminative loss by adjusting the first discriminator.

S403. determining a loss value of the second teacher generator based on the sample data and the second discriminator.

The implementation principle and technical effect of S403 may refer to the description of determining the loss value of the second generator based on the sample image and the discriminator in the preceding embodiments, and will not be repeated herein.

Optionally, the loss value of the second teacher generator comprises the adversarial loss of the second teacher generator. In this case, the adversarial loss function for calculating the adversarial loss of the second teacher generator may be expressed as:

$$L_{GAN}^{D}(G_T^D, D2) = E_{x,y}[\log D2(x, y)] + E_x[\log(1 - D2(x, G_T^D(x)))]$$

where $$L_{GAN}^{D}(G_T^D, D2)$$

denotes the adversarial loss function of the second teacher generator, $$G_T^D$$

denotes the first teacher generator, $$G_T^D(x)$$

denotes the output image of the second teacher generator after the sample image x is input into the second teacher generator, and D2 denotes the second discriminator.

Optionally, the loss value of the second teacher generator further comprises the reconstruction loss of the second teacher generator, in which case the reconstruction loss function for calculating the reconstruction loss of the second teacher generator may be expressed as:

$$L_{recon}^{D}(G_T^D, D2) = E_{(x,y)}[y - G_T^D(x)]$$

where $$L_{recon}^{D}(G_T^D, D2)$$

denotes the reconstruction loss function of the first teacher generator, and $$L_{recon}^{D}(G_T^D, D2)$$

denotes the difference between the reference image corresponding to the sample image and the output image of the first teacher generator.

S404. adjusting the second teacher generator based on the loss value of the second teacher generator.

The implementation principle and technical effect of S404 may refer to the description of adjusting the second generator based on the loss value of the second generator in the preceding embodiments, and will not be repeated herein.

Optionally, in the case where the loss value of the second teacher generator comprises the adversarial loss of the second teacher generator and the reconstruction loss of the second teacher generator, the optimization objective function of the second teacher generator is expressed as:

$$G_T^{W*} = \arg\min_{G_T}\max_{D} L_{GAN}(G_T^W, D2) + L_{recon}(G_T^W, D2)$$

where $$G_T^{W*}$$

denotes the optimization objective function in the training process of the second teacher generator, $$\max_{D} L_{GAN}(G_T^W, D2)$$

and denotes maximizing the discriminative loss by adjusting the second discriminator.

S405. adjusting the student generator based on the sample image, the adjusted first teacher generator, and the adjusted second teacher generator.

In this step, the sample image is processed with the adjusted first teacher generator, the adjusted second teacher generator, and the student generator, respectively. The model capacity of the first teacher generator is larger than the model capacity of the student generator, and the model depth of the second teacher generator is larger than the model depth of the student generator. Thus, there are differences between the data obtained by processing the sample image with the adjusted first teacher generator, the data obtained by processing the sample image with the adjusted second teacher generator, and the data obtained by processing the sample image with the student generator, respectively. With these differences, the distillation losses between the adjusted first teacher generator, the adjusted second teacher generator, and the student generator can be determined, respectively. Further, the student generator is adjusted based on the distillation losses between the adjusted first teacher generator, the adjusted second teacher generator, and the student generator respectively: In each training process, the optimization of the student generator is guided based on the optimized first teacher generator and the optimized second teacher generator, and the training effect of the student generator can be improved by synthesis of the first teacher generator and the second teacher generator.

In some embodiments, the distillation loss between the first teacher generator and the student generator comprises the output distillation loss between the first teacher generator and the student generator, i.e., a distillation loss between an output layer of the first teacher generator and an output layer of the student generator. Further, the output distillation loss may comprise the structural similarity loss and/or the perceptual loss between the output image of the first teacher generator and the output image of the student generator. Further, the perceptual loss may comprise the feature reconstruction loss and/or the style reconstruction loss between the output image of the first teacher generator and the output image of the student generator.

In some embodiments, the distillation loss between the second teacher generator and the student generator comprises the output distillation loss between the second teacher generator and the student generator, i.e., a distillation loss between an output layer of the second teacher generator and an output layer of the student generator. Further, the output distillation loss may comprise the structural similarity loss and/or the perceptual loss between the output image of the second teacher generator and the output image of the student generator. Further, the perceptual loss may comprise the feature reconstruction loss and/or the style reconstruction loss between the output image of the second teacher generator and the output image of the student generator.

The relevant contents of the distillation loss between the first teacher generator, the second teacher generator and the student generator, respectively, may refer to the detailed description of the distillation loss between the second generator and the first generator in the preceding embodiments, and will not be repeated herein.

In some embodiments, the model depth of the first teacher generator is the same as the model depth of the student generator, and compared to the student generator, the model capacity of the first teacher generator is larger, that is, the number of channels in the convolutional layer is larger, and thus can capture details that the student generator cannot capture. Considering that if the distillation loss between the teacher generator and the student generator only comprises the output distillation loss, i.e., only the information of the output layer of the teacher generator is distilled during the model distillation process, or only the difference between the output image of the teacher generator and the output image of the student generator is taken into account, while the information of the intermediate layer of the teacher generator is not taken into account. Therefore, based on the structural characteristics of the first teacher generator, the information of the intermediate layer of the first teacher generator, i.e., the information of the channel granularity, can be utilized as one of supervisory signals of the optimization process of the student generator, which further improves the training effect of the student generator.

Optionally, the distillation loss between the first teacher generator and the student generator comprises an output distillation loss and a channel distillation loss between the first teacher generator and the student generator, wherein the channel distillation loss is a distillation loss between an intermediate layer of the first teacher generator and an intermediate layer of the student generator, and reflects a difference between a feature of the sample image extracted by the intermediate layer of the first teacher generator and a feature of the sample image extracted by the intermediate layer of the student generator. Thus, by combining the output distillation loss and the channel distillation loss as the supervisory information optimized by the student generator, multi-granularity model distillation can be realized and the model distillation effect can be improved.

At this point, a possible implementation of S405 comprises: processing the sample image with the student generator, the adjusted first teacher generator, and the adjusted second teacher generator, respectively, to obtain the output image of the student generator and the output image of the first teacher generator, determining a first output distillation loss, the first output distillation loss being a distillation loss between the output layer of the first teacher generator and the output layer of the student generator: determining the channel distillation loss based on the feature map output by the intermediate layer of the student generator and the feature map output by the intermediate layer of the first teacher generator: determining the second output distillation loss based on the output image of the student generator and the output image of the second teacher generator, the second output distillation loss being the distillation loss between the output layer of the second teacher generator and the output layer of the student generator; and adjusting the student generator based on the first output distillation loss, the channel distillation loss, and the second output distillation loss.

The feature map output by the intermediate layer of the student generator refers to the features of the sample image extracted by the intermediate layer of the student generator, comprising the feature mapping value output by each channel in the intermediate layer of the student generator. Similarly, the feature map output by the intermediate layer of the first teacher generator refers to the features of the sample image extracted by the intermediate layer of the first teacher generator, comprising the feature mapping value output by each channel in the intermediate layer of the first teacher generator.

Specifically, since the model depth of the student generator is the same as the model depth of the first teacher generator, for each of the intermediate layers, a difference between the feature map output by the intermediate layer of the student generator and the feature map output by the intermediate layer of the first teacher generator is determined. Based on the difference, the channel distillation loss is determined. After obtaining the first output distillation loss, the channel distillation loss, and the second output distillation loss, the student generator is adjusted based on the first output distillation loss, the channel distillation loss, and the second output distillation loss.

Considering that the model capacity of the first teacher generator is larger than the model capacity of the student generator, and the number of channels in the intermediate layer of the first teacher generator is larger than the number of channels in the intermediate layer of the student generator, in some embodiments, the intermediate layer of the first teacher generator and the intermediate layer of the student generator are connected with a channel convolution layer, the channel convolution layer is used for establishing a mapping between a channel in the intermediate layer of the first teacher generator and a channel in the intermediate layer of the student generator. Thereby, based on the channel convolution layer, for each channel of the intermediate layer of the student generator, there exists a corresponding channel in the channels of the intermediate layer of the first teacher generator, and without changing the number of channels of the intermediate layer of the student generator, the extension of the number of channels of the intermediate layer of the student generator is realized via the channel convolution layer in the process of determining the channel distillation loss.

At this point, a possible implementation of determining the channel distillation loss based on the feature map output by the intermediate layer of the student generator and the feature map output by the intermediate layer of the first teacher generator comprises: determining an attention weight of each channel in the intermediate layer of the student generator based on a feature map output by the channel in the intermediate layer of the student generator: determining an attention weight of each channel in the intermediate layer of the first teacher generator based on a feature map output by the channel in the intermediate layer of the first teacher generator; and determining, in the intermediate layer of the student generator and the intermediate layer of the first teacher generator, the channel distillation loss based on a difference between attention weights of channels mapped to each other. The attention weight of a channel is used to measure the importance of the channel.

Specifically, in the student generator, for each channel in the intermediate layer, the attention weight of the channel may be calculated based on the pixels on the feature map output by the channel, e.g., a sum or average of all the pixels on the feature map output by the channel is determined to be the attention weight of the channel. In the first teacher generator, for each channel in the intermediate layer, the attention weight of the channel may be calculated based on the pixels on the feature map output by the channel. In each of the channels in the intermediate layer of the student generator and in each of the channels in the intermediate layer of the first teacher generator, channels that map to each other are determined, the attention weights of the channels that map to each other are compared, and a difference between the attention weights of the channels that map to each other is determined, and thus the channel distillation loss is determined.

Optionally, the channel convolution layer is a 1*1 learnable convolution layer, and the channels of the intermediate layer of the student generator are mapped to the channels of a corresponding intermediate layer of the first teacher generator through the 1*1 learnable convolution layer, such that the number of channels of the intermediate layer of the student generator is dimension raised to the same number of channels of the corresponding intermediate layer of the student generator.

Optionally, in the student generator, for each channel of the intermediate layer, the attention weight of the channel may be calculated based on each pixel on the feature map output by the channel and a size of the feature map output by the channel.

In a process based on each pixel on the feature map output by the channel and the size of the feature map output by the channel, each row of pixels on the feature map output by the channel may be summed to obtain a sum of pixels corresponding to each row: the sum of pixels corresponding to each row may be summed to obtain a total sum of pixels corresponding to the feature map; and the total sum of the pixels is averaged based on the size of the feature map to obtain an attention weight of the channel.

Further, the formula for calculating the attention weight of the channel may be expressed as:

$$W_c = \frac{1}{H \times W} \sum_{i=1}^{H} \sum_{j=1}^{W} u_c(i, j)$$

where $w_c$ denotes the attention weight of channel c, H denotes a height of the feature map output by the channel C, W denotes a width of the feature map output by the channel C, and $u_c(i, j)$ denotes the pixel at the position (i, j) on the feature map.

The process of determining the attention weight of the channel in the intermediate layer of the first teacher generator may refer to in the relevant description of the student generator, and thus will not be repeated herein.

Optionally, for each intermediate layer of the student generator and each intermediate layer of the teacher generator, a difference between the attention weights of each pair of channels mapped to each other is determined, and a channel distillation loss is determined based on the difference between the attention weights of the pair of channels mapped to each other, the number of samples of the feature maps in the intermediate layer of the student generator and in the intermediate layer of the first teacher generator, and the number of channels mapped by the feature maps. Accordingly, not only the attentional weights of each pair of channels mapped to each other, but also the number of channels in the intermediate layer and the number of feature maps sampled in the intermediate layers are considered, which improves the accuracy of the channel distillation loss.

The channel distillation loss function for calculating the channel distillation loss may be expressed as:

$$L_{cd}(G_T^W, G_S) = \frac{1}{n} \sum_{i=1}^{n} \left( \frac{\sum_{j=1}^{c} \left( w_{t_w}^{ij} - w_s^{ij} \right)^2}{c} \right)$$

where $$L_{cd}(G_T^W, G_S)$$

denotes the channel distillation loss function, n denotes the number of samples of the feature map, c denotes the number of channels mapped by the feature map, $$w_{t_w}^{ij}$$

denotes the attention weight of the j-th channel mapped by the i-th feature map in the first teacher generator.

Optionally, in adjusting the student generator based on the channel distillation loss, the first output distillation loss and the second distillation loss, the channel distillation loss is weighted based on a channel loss weighting factor, and a weighted result is obtained. The student generator is adjusted based on the weighted result, the first output distillation loss, and the second output distillation loss. Thereby, the influence degree of the channel distillation loss on the optimization process of the student generator may be adjusted by adjusting the channel loss weighting factor, and the flexibility of the training of the student generator may be improved.

Further, in the process of adjusting the student generator based on the weighting result of the channel distillation loss with the channel loss weighting factor, the first output distillation loss and the second output distillation loss, an online loss of the student generator with respect to the first teacher generator, and an online loss of the student generator with respect to the second teacher generator may be determined based on the first output distillation loss and the second output distillation loss, respectively. A weighted sum of the online loss of the first teacher generator, the online loss of the student generator with respect to the second teacher generator, and the weighted results of the channel distillation loss with the channel loss weighting factor is determined in order to balance these loss values in a weighted manner to obtain a final loss value for the multi-granularity online distillation of the student generator. Based on this final loss value, the model parameters of the student generator are adjusted to achieve the optimization of the student generator.

The online loss of the student generator with respect to the first teacher generator comprises: an output distillation loss between the student generator and the first teacher generator. Alternatively, the online loss of the student generator with respect to the first teacher generator comprises: an output distillation loss between the student generator and the first teacher generator and a total variance loss of the output image of the student generator. The online loss of the student generator with respect to the second teacher generator comprises: an output distillation loss between the student generator and the second teacher generator. Alternatively, the online loss of the student generator with respect to the second teacher generator comprises: an output distillation loss between the student generator and the second teacher generator and a total variance loss of the output image of the student generator. Details may refer to the online loss of the student generator with respect to the teacher generator in the preceding embodiments, and thus will not repeated herein.

Further, the objective loss function for calculating the final loss value for the multi-granularity online distillation of the student generator may be expressed as:

$$\mathcal{L}(G_T^W, G_T^D, G_S) == \lambda_{CD} L_{cd}(G_T^W, G_S) + L_{kd}(p_t^w, p_s) + L_{kd}(p_t^d, p_s)$$

where $$\mathcal{L}(G_T^W, G_T^D, G_S)$$

denotes the objective loss function, and $\lambda_{CD}$ denotes the channel loss weighting factor.

$$L_{kd}(p_t^w, p_s)$$

denotes the online loss function of the student generator with the first teacher generator, and $$L_{kd}(p_t^d, p_s)$$

denotes the online loss function of the student generator with the second teacher generator.

Figure 5:
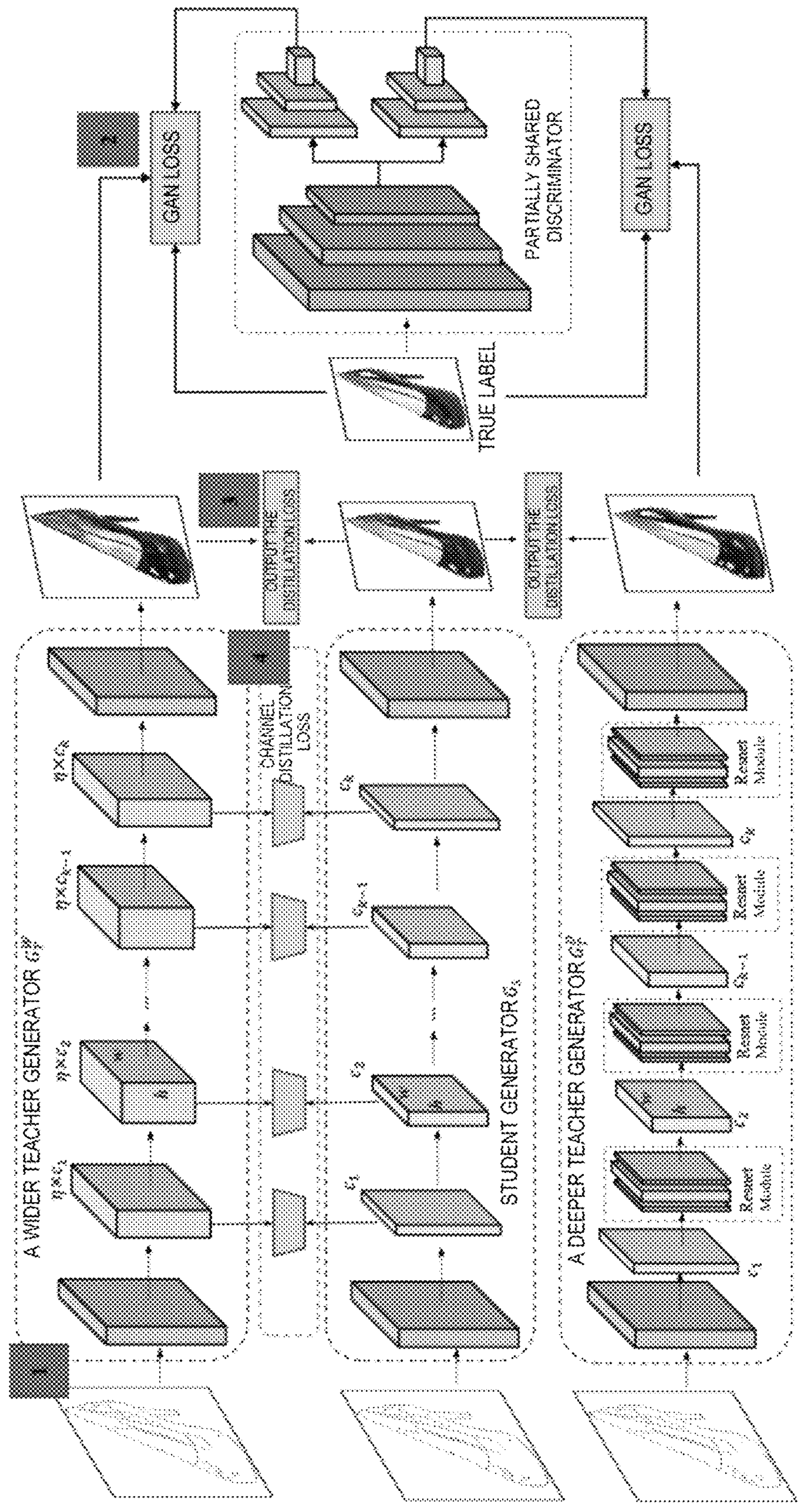
FIG. 5 shows a schematic diagram of a model structure of a generative adversarial network provided by the embodiments of the present disclosure.

Referring to FIG. 5, which shows a schematic diagram of a model structure of a generative adversarial network provided by the embodiments of the present disclosure. As shown in FIG. 5, the generative adversarial network comprises two teacher generators, a student generator $G_S$ and two discriminators which are partially shared. The two teacher generators comprise a wider teacher generator $$G_T^W$$

and a deeper teacher generator $$G_T^D,$$

and the two discriminators share multiple convolutional layers in front of them.

The number of channels in the intermediate layer of the wider teacher generator is $\eta \times c_1$: $\eta \times c_2$, . . . $\eta \times c_{k-1}$, $\eta \times c_k$, and the number of channels in the intermediate layer of the student generator is $c_1$, $C_2$, . . . , $c_{k-1}$, $c_k$. As can be seen that the teacher generator is the first teacher generator in the above-mentioned embodiments: compared to the student generator, the deeper teacher generator is equivalent to inserting a plurality of Resnet modules before and after a sampling layer of the student generator, and the depth of the model is greater than the depth of the model of the student generator. As can be seen that the teacher generator is the second teacher generator in the above-mentioned embodiments.

The intermediate layer of the wider teacher generator and the intermediate layer of the student generator are connected with a channel convolution layer (not shown in FIG. 5). According to the description of the preceding embodiments, it is known that the channel convolution layer is used to establish a mapping between the channels in the intermediate layer of the wider teacher generator and the channels in the intermediate layer of the student generator to facilitate the computation of the channel distillation loss between the wider teacher generator and the student generator.

As shown in FIG. 5, during the training process, the sample image (the outline of the high heeled shoe in FIG. 5) is input into the wider teacher generator, the student generator, and the deeper teacher generator, respectively. The GAN loss of the wider teacher generator is determined based on the partially shared discriminator, the output image of the wider teacher generator, and the true label (i.e., the reference image in the above-mentioned embodiments), that is, the adversarial loss of the first teacher generator in the above-mentioned embodiments, which is used to adjust the wider teacher generator. The GAN loss of the deeper teacher generator is determined based on the partially shared discriminator, the output image of the deeper teacher generator, and the true label, that is, the adversarial loss of the second teacher generator in the above-mentioned embodiments, which is used to adjust the deeper teacher generator. Based on the difference between the wider teacher generator and the student generator in the intermediate layer, the channel distillation loss is calculated. Based on the output image of the wider teacher generator, the output image of the student generator, and the output image of the deeper teacher generator, the output distillation loss between the wider teacher generator and the student generator and the output distillation loss between the deeper teacher generator and the student generator are calculated, respectively. The channel distillation loss and these two types of output distillation losses are used to adjust the student generator.

Figure 6:
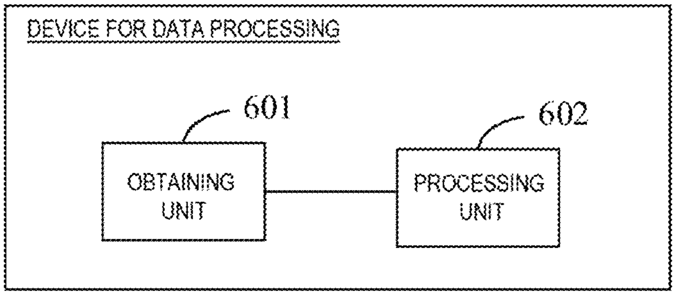
FIG. 6 shows a structural block diagram of a device for data processing provided by the embodiments of the present disclosure.

FIG. 6 shows a structural block diagram of a device for data processing provided by the embodiments of the present disclosure, which corresponds to the method for data processing described in the above embodiments. For ease of description, only the parts related to the embodiments of the present disclosure are illustrated. Referring to FIG. 6, the device for data processing comprises: an obtaining module 601 and a processing module 602.

The obtaining module 601 is configured for obtaining an image to be processed:

The processing module 602 is configured for processing the image with a first generator to obtain a processed image.

The device for data processing is adapted to a generative adversarial network obtained by model distillation, and the generative adversarial network comprises the first generator, a second generator and a discriminator. The model distillation is a process of alternately training the first generator and the second generator, and a model scale of the first generator is smaller than a model scale of the second generator.

In an embodiment of the present disclosure, a process of alternately training the first generator and the second generator in the generative adversarial network comprises:

determining a loss value of the second generator based on sample data and the discriminator, the sample data comprising a sample image and a reference image corresponding to the sample image;

adjusting the second generator based on the loss value of the second generator;

determining a distillation loss between the adjusted second generator and the first generator based on the sample image, the adjusted second generator and the first generator; and adjusting the first generator based on the distillation loss.

In an embodiment of the present disclosure, determining the loss value of the second generator based on the sample data and the discriminator comprises:

processing the sample image with the second generator to obtain an output image of the second generator;

performing, with the discriminator, a true or false discrimination between the reference image corresponding to the sample image and the output image of the second generator to determine an adversarial loss of the second generator;

determining a reconstruction loss of the second generator based on a difference between the reference image corresponding to the sample image and the output image of the second generator; and determining the loss value of the second generator based on the adversarial loss and the reconstruction loss.

In an embodiment of the present disclosure, in the generative adversarial network, a network layer comprises an input layer, an intermediate layer and an output layer, and determining the distillation loss between the adjusted second generator and the first generator based on the sample image, the adjusted second generator and the first generator comprises:

processing the sample image with the first generator and the adjusted second generator respectively, to obtain an output image of the first generator and an output image of the second generator; and determining an output distillation loss based on a difference between the output image of the first generator and the output image of the second generator, the output distillation loss being a distillation loss between an output layer of the second generator and an output layer of the first generator.

In an embodiment of the present disclosure, determining the output distillation loss based on the difference between the output image of the first generator and the output image of the second generator comprises:

determining a structural similarity loss between the output image of the second generator and the output image of the first generator based on a brightness and contrast of the output image of the second generator and a brightness and contrast of the output image of the first generator;

determining a perceptual loss between the output image of the first generator and the output image of the second generator by performing feature extraction on the output image of the first generator and the output image of the second generator with a feature extraction network, respectively; and determining the output distillation loss based on the structural similarity loss and the perceptual loss.

In an embodiment of the present disclosure, the perceptual loss comprises a feature reconstruction loss and/or a style reconstruction loss, and determining the perceptual loss between the output image of the first generator and the output image of the second generator by performing feature extraction on the first generator and the output image of the second generator with the feature extraction network respectively comprises:

inputting the output image of the first generator and the output image of the second generator into the feature extraction network respectively, to obtain a feature of the output image of the first generator and a feature of the output image of the second generator output by a predetermined network layer of the feature extraction network; and determining the feature reconstruction loss and/or the style reconstruction loss based on a difference between the feature of the output image of the first generator and the feature of the output image of the second generator.

In an embodiment of the present disclosure, adjusting the first generator based on the distillation loss comprises:

determining a total variation loss of an output image of the first generator; and adjusting the first generator based on the distillation loss and the total variation loss.

In an embodiment of the present disclosure, adjusting the first generator based on the distillation loss and the total variation loss comprises:

determining a weighted sum of the distillation loss and the total variation loss to obtain an online loss of the first generator; and adjusting the first generator based on the online loss of the first generator.

In an embodiment of the present disclosure, the first generator is a student generator, and the second generator is a teacher generator.

In an embodiment of the present disclosure, the teacher generator comprises a first teacher generator and a second teacher generator, a model capacity of the first teacher generator is greater than a model capacity of the student generator, and a model depth of the second teacher generator is greater than a model depth of the student generator.

In an embodiment of the present disclosure, the discriminator comprises a first discriminator and a second discriminator, a convolutional layer is shared between the first discriminator and the second discriminator, and a process of alternately training the first generator and the second generator in the generative adversarial network comprises:

determining a loss value of the first teacher generator based on sample data and the first discriminator, the sample data comprising a sample image and a reference image of the sample image;

adjusting the first teacher generator based on the loss value of the first teacher generator;

determining a loss value of the second teacher generator based on the sample data and the second discriminator;

adjusting the second teacher generator based on the loss value of the second teacher generator; and adjusting the student generator based on the sample image, the adjusted first teacher generator, and the adjusted second teacher generator.

In an embodiment of the present disclosure, in the generative adversarial network, a network layer comprises an input layer, an intermediate layer and an output layer, and adjusting the student generator based on the sample image, the adjusted first teacher generator, and the adjusted second teacher generator comprises:

processing the sample image with the student generator, the adjusted first teacher generator, and the adjusted second teacher generator respectively, to obtain an output image of the student generator, an output image of the first teacher generator, and an output image of the second teacher generator;

determining a first output distillation loss based on the output image of the student generator and the output image of the first teacher generator, the first output distillation loss being a distillation loss between an output layer of the first teacher generator and an output layer of the student generator;

determining a channel distillation loss based on a feature map output by an intermediate layer of the student generator and a feature map output by an intermediate layer of the first teacher generator, the channel distillation loss being a distillation loss between the intermediate layer of the first teacher generator and the intermediate layer of the student generator;

determining a second output distillation loss based on the output image of the student generator and the output image of the second teacher generator, the second output distillation loss being a distillation loss between an output layer of the second teacher generator and the output layer of the student generator; and adjusting the student generator based on the first output distillation loss, the channel distillation loss, and the second output distillation loss.

In an embodiment of the present disclosure, the intermediate layer of the first teacher generator and the intermediate layer of the student generator are connected with a channel convolution layer, the channel convolution layer is used for establishing a mapping between a channel in the intermediate layer of the first teacher generator and a channel in the intermediate layer of the student generator, and determining the channel distillation loss based on the feature map output by the intermediate layer of the student generator and the feature map output by the intermediate layer of the first teacher generator comprises:

determining an attention weight of each channel in the intermediate layer of the student generator based on a feature map output by the channel in the intermediate layer of the student generator;

determining an attention weight of each channel in the intermediate layer of the first teacher generator based on a feature map output by the channel in the intermediate layer of the first teacher generator; and determining, in the intermediate layer of the student generator and the intermediate layer of the first teacher generator, the channel distillation loss based on a difference between attention weights of channels mapped to each other.

In an embodiment of the present disclosure, adjusting the student generator based on the first output distillation loss, the channel distillation loss, and the second output distillation loss comprises:

weighting the channel distillation loss based on a channel loss weighting factor to obtain a weighted result; and adjusting the student generator based on the weighted result, the first output distillation loss, and the second output distillation loss.

The device provided in this embodiment may be used to carry out the technical solution of the above method embodiment, and its implementation principle and technical effect are similar, and thus this embodiment will not be repeated herein.

Figure 7:
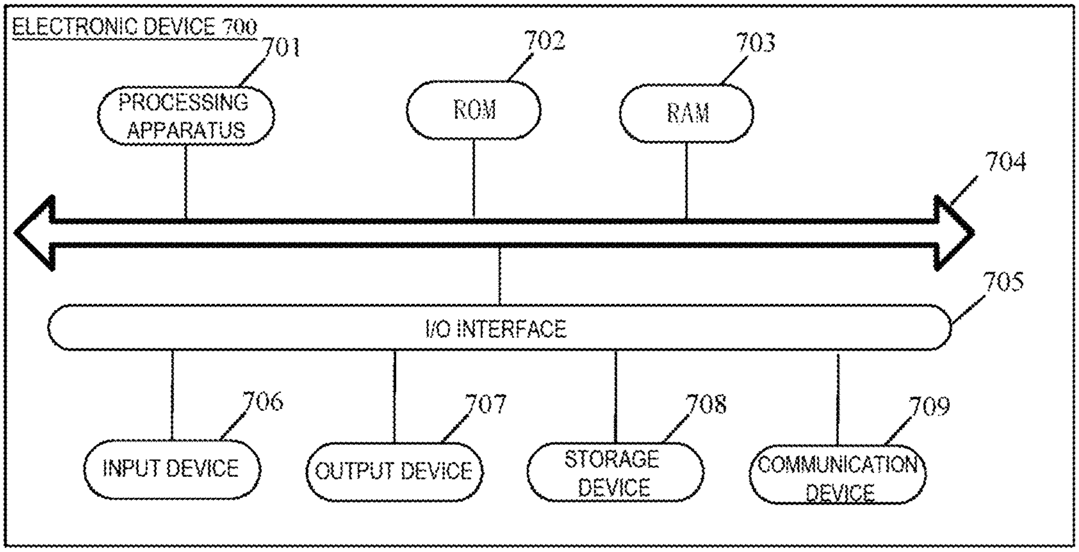
FIG. 7 shows a schematic diagram of a hardware structure of an electronic device provided by the embodiments of the present disclosure.

Referring to FIG. 7, which shows a schematic structural diagram of an electronic device 700 suitable for implementing the embodiments of the present disclosure. The electronic device 700 may be a terminal device or a server. Herein, the terminal device may include, but are not limited to, a mobile terminal, such as, a mobile phone, a laptop, a digital broadcasting receiver, a Personal Digital Assistant (PDA), a Portable Android Device (PAD), a Portable Media Player (PMP), vehicle terminals (e.g., vehicle-mounted navigation terminal), as well as a fixed terminal, such as, a digital TV, a desktop computer, etc. The electronic device shown in FIG. 7 is only an example and should not limit to the function and scope of usage of the embodiments of the present disclosure.

As shown in FIG. 7, the electronic device 700 may include a processing apparatus (e.g., a central processing unit, a graphics processing unit, etc.) 701, which may perform various appropriate actions and processing according to a program stored in a read-only memory (ROM) 702 or loaded from a storage device 708 into a random access memory (RAM) 703. The RAM 703 also stores various programs and data required for the operations of the electronic device 700. The processing apparatus 701, the ROM 702, and the RAM 703 are connected to each other through the bus 704. An Input/Output (I/O) interface 705 is also connected to the bus 704.

Generally, the following apparatuses may be connected to the I/O interface 705: an input device 706, including, for example, touch screen, touch pad, keyboard, mice, camera, microphone, accelerometer, gyroscope, etc.: an output device 707, including, for example, liquid crystal display (LCD), speaker, a vibrator, etc.: a storage device 708, including, for example, magnetic tape, hard disk, etc.; and a communication device 709. The communication device 709 may allow the electronic device 700 to perform wireless or wired communication with other devices to exchange data. Although FIG. 7 illustrates the electronic device 700 with various apparatuses, it should be understood that it is not required to implement or have all of the illustrated apparatuses. Alternatively, more or fewer apparatuses may be implemented or provided.

Specifically, according to the embodiments of the present disclosure, the process described above with reference to the flow diagram may be implemented as a computer software program. For example, an embodiment of the present disclosure includes a computer program product, which includes a computer program carried on a computer-readable medium, and the computer program includes a program code for executing the method shown in the flowchart. In such embodiments, the computer program may be downloaded and installed from the network through the communication device 709, installed from the storage device 708, or installed from the ROM 702. When the computer program is executed by the processing apparatus 701, the above functions defined in the embodiment of the present disclosure are executed.

It should be noted that the computer-readable medium mentioned in the present disclosure may be a computer-readable signal medium, a computer-readable storage medium, or any combination of the two. The computer-readable storage medium may be, for example, but not limited to, an electrical, magnetic, optical, electromagnetic, infrared, or semiconductor system, apparatus, or device, or a combination of any of the above. More specific examples of the computer-readable storage medium may include but are not limited to electrical connections with one or more wires, portable computer disks, hard disks, random access memory (RAM), read-only memory (ROM), erasable programmable read-only memory (EPROM or flash memory), optical fiber, portable compact disc read-only memory (CD-ROM), optical storage devices, magnetic storage devices, or any suitable combination of the above. In the present disclosure, a computer-readable storage medium may be any tangible medium that contains or stores a program, which may be used by or in combination with an instruction execution system, apparatus, or device. In the present disclosure, the computer-readable signal medium may include data signals propagated in the baseband/or as part of the carrier, wherein a computer-readable program code is carried. The propagation of data signals may adopt various forms, including but not limited to electromagnetic signals, optical signals, or any suitable combination of the above. The computer-readable signal medium may also be any computer-readable medium other than a computer-readable storage medium. The computer-readable signal medium may send, propagate, or transmit programs for use by or in combination with instruction execution systems, apparatuses, or devices. The program code contained on the computer-readable medium may be transmitted by any suitable medium, including but not limited to wire, optical cable, RF (Radio Frequency), etc., or any suitable combination of the above.

The computer-readable medium may be included in the electronic device, or it may exist alone without being assembled into the electronic device.

The computer-readable medium carries one or more programs, and when one or more programs are executed by the electronic device, the electronic device is caused to execute the method shown in the embodiment.

The computer program code used to perform the operations of the present disclosure may be written in one or more programming languages or a combination thereof. The programming languages include object-oriented programming languages-such as Java, Smalltalk, and C++, and also conventional procedural programming languages such as “C” language or similar programming languages. The program code may be executed entirely on the user’s computer, partly on the user’s computer, executed as an independent software package, partly on the user’s computer, partly executed on a remote computer, or entirely executed on the remote computer or server. In the case of a remote computer, the remote computer may be connected to the user’s computer through any kind of network-including a Local Area Network (LAN) or a Wide Area Network (WAN)—or, it may be connected to an external computer (for example, using an Internet service provider to connect via the Internet).

The flow diagrams and block diagrams in the accompanying drawings illustrate the possible impossible architecture, functions, and operations of systems, methods, and computer program products according to various embodiments in the present disclosure. At this point, each block in a flow diagram or block diagram may represent a module, program segment, or part of code that contains one or more executable instructions for implementing specified logical functions. It should also be noted that in some alternative implementations, the functions indicated in the blocks may also occur in a different order than those indicated in the accompanying drawings. For example, two consecutive blocks may actually be executed in parallel, and sometimes they may also be executed in the opposite order, depending on the function involved. It should also be noted that each block in the block diagram and/or flow diagram, as well as the combination of blocks in the block diagram and/or flow diagram, may be implemented using dedicated hardware-based systems that perform specified functions or operations or may be implemented using a combination of dedicated hardware and computer instructions.

The units involved in the embodiments described in the present disclosure may be implemented by way of software or by way of hardware. Herein, the name of the unit does not constitute a limitation on the unit itself under certain circumstances. For example, a first obtaining unit may also be described as “a unit for obtaining at least two Internet Protocol addresses.”

The functions described above herein may be at least partially executed by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD), and so on.

In the context of the present disclosure, a machine-readable medium may be a tangible medium, which may contain or store a program for use by the instruction execution system, apparatus, or device, or for use in combination with the instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor system, apparatus, or device, or any suitable combination of the foregoing. More specific examples of machine-readable storage media would include electrical connections based on one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

In a first aspect, according to one or more embodiments of the present disclosure, there is provided a method for data processing adapted to a generative adversarial network obtained by model distillation. The method for data processing comprises: obtaining an image to be processed; and processing the image with a first generator to obtain a processed image: wherein the generative adversarial network comprises the first generator, a second generator and a discriminator, the model distillation is a process of alternately training the first generator and the second generator, and a model scale of the first generator is smaller than a model scale of the second generator.

According to one or more embodiments of the present disclosure, a process of alternately training the first generator and the second generator in the generative adversarial network comprises: determining a loss value of the second generator based on sample data and the discriminator, the sample data comprising a sample image and a reference image corresponding to the sample image: adjusting the second generator based on the loss value of the second generator: determining a distillation loss between the adjusted second generator and the first generator based on the sample image, the adjusted second generator and the first generator; and adjusting the first generator based on the distillation loss.

According to one or more embodiments of the present disclosure, determining the loss value of the second generator based on the sample data and the discriminator comprises: processing the sample image with the second generator to obtain an output image of the second generator: performing, with the discriminator, a true or false discrimination between the reference image corresponding to the sample image and the output image of the second generator to determine an adversarial loss of the second generator: determining a reconstruction loss of the second generator based on a difference between the reference image corresponding to the sample image and the output image of the second generator; and determining the loss value of the second generator based on the adversarial loss and the reconstruction loss.

According to one or more embodiments of the present disclosure, in the generative adversarial network, a network layer comprises an input layer, an intermediate layer and an output layer, and determining the distillation loss between the adjusted second generator and the first generator based on the sample image, the adjusted second generator and the first generator comprises: processing the sample image with the first generator and the adjusted second generator respectively, to obtain an output image of the first generator and an output image of the second generator; and determining an output distillation loss based on a difference between the output image of the first generator and the output image of the second generator, the output distillation loss being a distillation loss between an output layer of the second generator and an output layer of the first generator.

According to one or more embodiments of the present disclosure, determining the output distillation loss based on the difference between the output image of the first generator and the output image of the second generator comprises:

determining a structural similarity loss between the output image of the second generator and the output image of the first generator based on a brightness and contrast of the output image of the second generator and a brightness and contrast of the output image of the first generator: determining a perceptual loss between the output image of the first generator and the output image of the second generator by performing feature extraction on the output image of the first generator and the output image of the second generator with a feature extraction network, respectively; and determining the output distillation loss based on the structural similarity loss and the perceptual loss.

According to one or more embodiments of the present disclosure, the perceptual loss comprises a feature reconstruction loss and/or a style reconstruction loss, and determining the perceptual loss between the output image of the first generator and the output image of the second generator by performing feature extraction on the first generator and the output image of the second generator with the feature extraction network respectively comprises:

inputting the output image of the first generator and the output image of the second generator into the feature extraction network respectively, to obtain a feature of the output image of the first generator and a feature of the output image of the second generator output by a predetermined network layer of the feature extraction network; and determining the feature reconstruction loss and/or the style reconstruction loss based on a difference between the feature of the output image of the first generator and the feature of the output image of the second generator.

According to one or more embodiments of the present disclosure, adjusting the first generator based on the distillation loss comprises: determining a total variation loss of an output image of the first generator; and adjusting the first generator based on the distillation loss and the total variation loss.

According to one or more embodiments of the present disclosure, adjusting the first generator based on the distillation loss and the total variation loss comprises: determining a weighted sum of the distillation loss and the total variation loss to obtain an online loss of the first generator; and adjusting the first generator based on the online loss of the first generator.

According to one or more embodiments of the present disclosure, the first generator is a student generator, and the second generator is a teacher generator.

According to one or more embodiments of the present disclosure, the teacher generator comprises a first teacher generator and a second teacher generator, a model capacity of the first teacher generator is greater than a model capacity of the student generator, and a model depth of the second teacher generator is greater than a model depth of the student generator.

According to one or more embodiments of the present disclosure, the discriminator comprises a first discriminator and a second discriminator, a convolutional layer is shared between the first discriminator and the second discriminator, and a process of alternately training the first generator and the second generator in the generative adversarial network comprises: determining a loss value of the first teacher generator based on sample data and the first discriminator, the sample data comprising a sample image and a reference image of the sample image: adjusting the first teacher generator based on the loss value of the first teacher generator: determining a loss value of the second teacher generator based on the sample data and the second discriminator: adjusting the second teacher generator based on the loss value of the second teacher generator; and adjusting the student generator based on the sample image, the adjusted first teacher generator, and the adjusted second teacher generator.

According to one or more embodiments of the present disclosure, in the generative adversarial network, a network layer comprises an input layer, an intermediate layer and an output layer, and adjusting the student generator based on the sample image, the adjusted first teacher generator, and the adjusted second teacher generator comprises: processing the sample image with the student generator, the adjusted first teacher generator, and the adjusted second teacher generator respectively, to obtain an output image of the student generator, an output image of the first teacher generator, and an output image of the second teacher generator: determining a first output distillation loss based on the output image of the student generator and the output image of the first teacher generator, the first output distillation loss being a distillation loss between an output layer of the first teacher generator and an output layer of the student generator: determining a channel distillation loss based on a feature map output by an intermediate layer of the student generator and a feature map output by an intermediate layer of the first teacher generator, the channel distillation loss being a distillation loss between the intermediate layer of the first teacher generator and the intermediate layer of the student generator: determining a second output distillation loss based on the output image of the student generator and the output image of the second teacher generator, the second output distillation loss being a distillation loss between an output layer of the second teacher generator and the output layer of the student generator; and adjusting the student generator based on the first output distillation loss, the channel distillation loss, and the second output distillation loss.

According to one or more embodiments of the present disclosure, the intermediate layer of the first teacher generator and the intermediate layer of the student generator are connected with a channel convolution layer, the channel convolution layer is used for establishing a mapping between a channel in the intermediate layer of the first teacher generator and a channel in the intermediate layer of the student generator, and determining the channel distillation loss based on the feature map output by the intermediate layer of the student generator and the feature map output by the intermediate layer of the first teacher generator comprises: determining an attention weight of each channel in the intermediate layer of the student generator based on a feature map output by the channel in the intermediate layer of the student generator: determining an attention weight of each channel in the intermediate layer of the first teacher generator based on a feature map output by the channel in the intermediate layer of the first teacher generator; and determining, in the intermediate layer of the student generator and the intermediate layer of the first teacher generator, the channel distillation loss based on a difference between attention weights of channels mapped to each other.

According to one or more embodiments of the present disclosure, adjusting the student generator based on the first output distillation loss, the channel distillation loss, and the second output distillation loss comprises: weighting the channel distillation loss based on a channel loss weighting factor to obtain a weighted result; and adjusting the student generator based on the weighted result, the first output distillation loss, and the second output distillation loss.

In a second aspect, according to one or more embodiments of the present disclosure, there is provided a device for data processing adapted to a generative adversarial network obtained by model distillation. The device for data processing comprises: an obtaining module configured for obtaining an image to be processed; and a processing module configured for processing the image with a first generator to obtain a processed image: wherein the generative adversarial network comprises the first generator, a second generator and a discriminator, the model distillation is a process of alternately training the first generator and the second generator, and a model scale of the first generator is smaller than a model scale of the second generator.

According to one or more embodiments of the present disclosure, a process of alternately training the first generator and the second generator in the generative adversarial network comprises: determining a loss value of the second generator based on sample data and the discriminator, the sample data comprising a sample image and a reference image corresponding to the sample image: adjusting the second generator based on the loss value of the second generator: determining a distillation loss between the adjusted second generator and the first generator based on the sample image, the adjusted second generator and the first generator; and adjusting the first generator based on the distillation loss.

According to one or more embodiments of the present disclosure, determining the loss value of the second generator based on the sample data and the discriminator comprises: processing the sample image with the second generator to obtain an output image of the second generator; performing, with the discriminator, a true or false discrimination between the reference image corresponding to the sample image and the output image of the second generator to determine an adversarial loss of the second generator: determining a reconstruction loss of the second generator based on a difference between the reference image corresponding to the sample image and the output image of the second generator; and determining the loss value of the second generator based on the adversarial loss and the reconstruction loss.

According to one or more embodiments of the present disclosure, in the generative adversarial network, a network layer comprises an input layer, an intermediate layer and an output layer, and determining the distillation loss between the adjusted second generator and the first generator based on the sample image, the adjusted second generator and the first generator comprises: processing the sample image with the first generator and the adjusted second generator respectively, to obtain an output image of the first generator and an output image of the second generator; and determining an output distillation loss based on a difference between the output image of the first generator and the output image of the second generator, the output distillation loss being a distillation loss between an output layer of the second generator and an output layer of the first generator.

According to one or more embodiments of the present disclosure, determining the output distillation loss based on the difference between the output image of the first generator and the output image of the second generator comprises:

determining a structural similarity loss between the output image of the second generator and the output image of the first generator based on a brightness and contrast of the output image of the second generator and a brightness and contrast of the output image of the first generator: determining a perceptual loss between the output image of the first generator and the output image of the second generator by performing feature extraction on the output image of the first generator and the output image of the second generator with a feature extraction network, respectively; and determining the output distillation loss based on the structural similarity loss and the perceptual loss.

According to one or more embodiments of the present disclosure, the perceptual loss comprises a feature reconstruction loss and/or a style reconstruction loss, and determining the perceptual loss between the output image of the first generator and the output image of the second generator by performing feature extraction on the first generator and the output image of the second generator with the feature extraction network respectively comprises:

inputting the output image of the first generator and the output image of the second generator into the feature extraction network respectively, to obtain a feature of the output image of the first generator and a feature of the output image of the second generator output by a predetermined network layer of the feature extraction network; and determining the feature reconstruction loss and/or the style reconstruction loss based on a difference between the feature of the output image of the first generator and the feature of the output image of the second generator.

According to one or more embodiments of the present disclosure, adjusting the first generator based on the distillation loss comprises: determining a total variation loss of an output image of the first generator; and adjusting the first generator based on the distillation loss and the total variation loss.

According to one or more embodiments of the present disclosure, adjusting the first generator based on the distillation loss and the total variation loss comprises: determining a weighted sum of the distillation loss and the total variation loss to obtain an online loss of the first generator; and adjusting the first generator based on the online loss of the first generator.

According to one or more embodiments of the present disclosure, the first generator is a student generator, and the second generator is a teacher generator.

According to one or more embodiments of the present disclosure, the teacher generator comprises a first teacher generator and a second teacher generator, a model capacity of the first teacher generator is greater than a model capacity of the student generator, and a model depth of the second teacher generator is greater than a model depth of the student generator.

According to one or more embodiments of the present disclosure, the discriminator comprises a first discriminator and a second discriminator, a convolutional layer is shared between the first discriminator and the second discriminator, and a process of alternately training the first generator and the second generator in the generative adversarial network comprises: determining a loss value of the first teacher generator based on sample data and the first discriminator, the sample data comprising a sample image and a reference image of the sample image: adjusting the first teacher generator based on the loss value of the first teacher generator: determining a loss value of the second teacher generator based on the sample data and the second discriminator: adjusting the second teacher generator based on the loss value of the second teacher generator; and adjusting the student generator based on the sample image, the adjusted first teacher generator, and the adjusted second teacher generator.

According to one or more embodiments of the present disclosure, in the generative adversarial network, a network layer comprises an input layer, an intermediate layer and an output layer, and adjusting the student generator based on the sample image, the adjusted first teacher generator, and the adjusted second teacher generator comprises: processing the sample image with the student generator, the adjusted first teacher generator, and the adjusted second teacher generator respectively, to obtain an output image of the student generator, an output image of the first teacher generator, and an output image of the second teacher generator: determining a first output distillation loss based on the output image of the student generator and the output image of the first teacher generator, the first output distillation loss being a distillation loss between an output layer of the first teacher generator and an output layer of the student generator: determining a channel distillation loss based on a feature map output by an intermediate layer of the student generator and a feature map output by an intermediate layer of the first teacher generator, the channel distillation loss being a distillation loss between the intermediate layer of the first teacher generator and the intermediate layer of the student generator: determining a second output distillation loss based on the output image of the student generator and the output image of the second teacher generator, the second output distillation loss being a distillation loss between an output layer of the second teacher generator and the output layer of the student generator; and adjusting the student generator based on the first output distillation loss, the channel distillation loss, and the second output distillation loss.

According to one or more embodiments of the present disclosure, the intermediate layer of the first teacher generator and the intermediate layer of the student generator are connected with a channel convolution layer, the channel convolution layer is used for establishing a mapping between a channel in the intermediate layer of the first teacher generator and a channel in the intermediate layer of the student generator, and determining the channel distillation loss based on the feature map output by the intermediate layer of the student generator and the feature map output by the intermediate layer of the first teacher generator comprises: determining an attention weight of each channel in the intermediate layer of the student generator based on a feature map output by the channel in the intermediate layer of the student generator: determining an attention weight of each channel in the intermediate layer of the first teacher generator based on a feature map output by the channel in the intermediate layer of the first teacher generator; and determining, in the intermediate layer of the student generator and the intermediate layer of the first teacher generator, the channel distillation loss based on a difference between attention weights of channels mapped to each other.

According to one or more embodiments of the present disclosure, adjusting the student generator based on the first output distillation loss, the channel distillation loss, and the second output distillation loss comprises: weighting the channel distillation loss based on a channel loss weighting factor to obtain a weighted result; and adjusting the student generator based on the weighted result, the first output distillation loss, and the second output distillation loss.

In a third aspect, according to one or more embodiments of the present disclosure, there is provided an electronic device comprising: at least one processor and a memory;

the memory storing computer-executable instructions;

the at least one processor executing the computer-executable instructions stored in the memory to cause the at least one processor to carry out the method for data processing as described in the above first aspect and various possible designs of the first aspect.

In a fourth aspect, according to one or more embodiments of the present disclosure, there is provided a computer-readable storage medium. The computer-readable storage medium stores computer-executable instructions which, when executed by a processor, carry out the method for data processing as described in the above first aspect and various possible designs of the first aspect.

In a fifth aspect, according to one or more embodiments of the present disclosure, there is provided a computer program product comprising computer-executable instructions which, when executed by a processor, carry out the method for data processing as described in the above first aspect and various possible designs of the first aspect.

In a sixth aspect, the embodiments of the present disclosure provide a computer program comprising computer-executable instructions which, when executed by a processor, carry out the method for data processing as described in the above first aspect and various possible designs of the first aspect.

The above description is only a preferred embodiments of the present disclosure and an illustration of the technical principles utilized. It should be understood by those skilled in the art that the scope of the disclosure involved in the present disclosure is not limited to technical solutions formed by specific combinations of the above technical features, but also covers other technical solutions formed by any combination of the above technical features or their equivalent features without departing from the above disclosed concepts, for example, a technical solution formed by replacing the above-mentioned features with technical features having similar functions disclosed (but not limited to) in the present disclosure.

Furthermore, although the operations are depicted in a specific order, it should not be understood as requiring these operations to be executed in the specific order as shown or in a sequential order. Under certain circumstances, multitasking and parallel processing may be advantageous. Similarly, although several specific implementation details are included in the above discussion, these should not be interpreted as limiting the scope of the present disclosure. Some features described in the context of individual embodiments may also be combined and implemented in a single embodiment. On the contrary, various features described in the context of a single embodiment may also be implemented individually or in any suitable sub-combination in a plurality of embodiments.

Although the subject matter has been described in language specific to structural features and/or method logical actions, it should be understood that the subject matter defined in the appended claims may not necessarily be limited to the specific features or actions described above. On the contrary, the specific features and actions described above are only exemplary forms of implementing the claims.

What is claimed is:

1. A method for data processing adapted to a generative adversarial network obtained by model distillation, wherein the method for data processing comprises:
- obtaining an image to be processed; and
- processing the image with a first generator to obtain a processed image;
- wherein the generative adversarial network comprises the first generator, a second generator and a discriminator, the model distillation is a process of alternately training the first generator and the second generator comprising:
- determining a loss value of the second generator based on sample data and the discriminator, the sample data comprising a sample image and a reference image corresponding to the sample image;
- adjusting the second generator based on the loss value of the second generator;
- determining a distillation loss between the adjusted second generator and the first generator based on the sample image, the adjusted second generator and the first generator; and
- adjusting the first generator based on the distillation loss, and
- a model scale of the first generator is smaller than a model scale of the second generator.

2. The method for data processing of claim 1, wherein determining the loss value of the second generator based on the sample data and the discriminator comprises:
- processing the sample image with the second generator to obtain an output image of the second generator;
- performing, with the discriminator, a true or false discrimination between the reference image corresponding to the sample image and the output image of the second generator to determine an adversarial loss of the second generator;
- determining a reconstruction loss of the second generator based on a difference between the reference image corresponding to the sample image and the output image of the second generator; and
- determining the loss value of the second generator based on the adversarial loss and the reconstruction loss.

3. The method for data processing of claim 1, wherein in the generative adversarial network, a network layer comprises an input layer, an intermediate layer and an output layer, and determining the distillation loss between the adjusted second generator and the first generator based on the sample image, the adjusted second generator and the first generator comprises:
- processing the sample image with the first generator and the adjusted second generator respectively, to obtain an output image of the first generator and an output image of the second generator; and
- determining an output distillation loss based on a difference between the output image of the first generator and the output image of the second generator, the output distillation loss being a distillation loss between an output layer of the second generator and an output layer of the first generator.

4. The method for data processing of claim 3, wherein determining the output distillation loss based on the difference between the output image of the first generator and the output image of the second generator comprises:
- determining a structural similarity loss between the output image of the second generator and the output image of the first generator based on a brightness and contrast of the output image of the second generator and a brightness and contrast of the output image of the first generator;
- determining a perceptual loss between the output image of the first generator and the output image of the second generator by performing feature extraction on the output image of the first generator and the output image of the second generator with a feature extraction network, respectively; and
- determining the output distillation loss based on the structural similarity loss and the perceptual loss.

5. The method for data processing of claim 4, wherein the perceptual loss comprises at least one of a feature reconstruction loss or a style reconstruction loss, and determining the perceptual loss between the output image of the first generator and the output image of the second generator by performing feature extraction on the first generator and the output image of the second generator with the feature extraction network respectively comprises:
- inputting the output image of the first generator and the output image of the second generator into the feature extraction network respectively, to obtain a feature of the output image of the first generator and a feature of the output image of the second generator output by a predetermined network layer of the feature extraction network; and
- determining at least one of the feature reconstruction loss or the style reconstruction loss based on a difference between the feature of the output image of the first generator and the feature of the output image of the second generator.

6. The method for data processing of claim 1, wherein adjusting the first generator based on the distillation loss comprises:
- determining a total variation loss of an output image of the first generator; and
- adjusting the first generator based on the distillation loss and the total variation loss.

7. The method for data processing of claim 6, wherein adjusting the first generator based on the distillation loss and the total variation loss comprises:
- determining a weighted sum of the distillation loss and the total variation loss to obtain an online loss of the first generator; and
- adjusting the first generator based on the online loss of the first generator.

8. The method for data processing of claim 1, wherein the first generator is a student generator, and the second generator is a teacher generator.

9. The method for data processing of claim 8, wherein the teacher generator comprises a first teacher generator and a second teacher generator, a model capacity of the first teacher generator is greater than a model capacity of the student generator, and a model depth of the second teacher generator is greater than a model depth of the student generator.

10. The method for data processing of claim 9, wherein the discriminator comprises a first discriminator and a second discriminator, a convolutional layer is shared between the first discriminator and the second discriminator, and a process of alternately training the first generator and the second generator in the generative adversarial network comprises:

determining a loss value of the first teacher generator based on sample data and the first discriminator, the sample data comprising a sample image and a reference image of the sample image;

adjusting the first teacher generator based on the loss value of the first teacher generator;

determining a loss value of the second teacher generator based on the sample data and the second discriminator;

adjusting the second teacher generator based on the loss value of the second teacher generator; and adjusting the student generator based on the sample image, the adjusted first teacher generator, and the adjusted second teacher generator.

11. The method for data processing of claim 10, wherein in the generative adversarial network, a network layer comprises an input layer, an intermediate layer and an output layer, and adjusting the student generator based on the sample image, the adjusted first teacher generator, and the adjusted second teacher generator comprises:

processing the sample image with the student generator, the adjusted first teacher generator, and the adjusted second teacher generator respectively, to obtain an output image of the student generator, an output image of the first teacher generator, and an output image of the second teacher generator;

determining a first output distillation loss based on the output image of the student generator and the output image of the first teacher generator, the first output distillation loss being a distillation loss between an output layer of the first teacher generator and an output layer of the student generator;

determining a channel distillation loss based on a feature map output by an intermediate layer of the student generator and a feature map output by an intermediate layer of the first teacher generator, the channel distillation loss being a distillation loss between the intermediate layer of the first teacher generator and the intermediate layer of the student generator;

determining a second output distillation loss based on the output image of the student generator and the output image of the second teacher generator, the second output distillation loss being a distillation loss between an output layer of the second teacher generator and the output layer of the student generator; and adjusting the student generator based on the first output distillation loss, the channel distillation loss, and the second output distillation loss.

12. The method for data processing of claim 11, wherein the intermediate layer of the first teacher generator and the intermediate layer of the student generator are connected with a channel convolution layer, the channel convolution layer is used for establishing a mapping between a channel in the intermediate layer of the first teacher generator and a channel in the intermediate layer of the student generator, and determining the channel distillation loss based on the feature map output by the intermediate layer of the student generator and the feature map output by the intermediate layer of the first teacher generator comprises:

determining an attention weight of each channel in the intermediate layer of the student generator based on a feature map output by the channel in the intermediate layer of the student generator;

determining an attention weight of each channel in the intermediate layer of the first teacher generator based on a feature map output by the channel in the intermediate layer of the first teacher generator; and determining, in the intermediate layer of the student generator and the intermediate layer of the first teacher generator, the channel distillation loss based on a difference between attention weights of channels mapped to each other.

13. The method for data processing of claim 11, wherein adjusting the student generator based on the first output distillation loss, the channel distillation loss, and the second output distillation loss comprises:

weighting the channel distillation loss based on a channel loss weighting factor to obtain a weighted result; and adjusting the student generator based on the weighted result, the first output distillation loss, and the second output distillation loss.

14. An electronic device comprising at least one processor and a memory;

the memory stores computer-executable instructions;

the computer-executable instructions stored in the memory which, when executed by the at least one processor, cause the at least one processor to carry out a method for data processing adapted to a generative adversarial network obtained by model distillation, wherein the method comprises:

obtaining an image to be processed; and processing the image with a first generator to obtain a processed image;

wherein the generative adversarial network comprises the first generator, a second generator and a discriminator, the model distillation is a process of alternately training the first generator and the second generator comprising:

determining a loss value of the second generator based on sample data and the discriminator, the sample data comprising a sample image and a reference image corresponding to the sample image;

adjusting the second generator based on the loss value of the second generator;

determining a distillation loss between the adjusted second generator and the first generator based on the sample image, the adjusted second generator and the first generator; and adjusting the first generator based on the distillation loss, and a model scale of the first generator is smaller than a model scale of the second generator.

15. The electronic device of claim 14, wherein determining the loss value of the second generator based on the sample data and the discriminator comprises:

processing the sample image with the second generator to obtain an output image of the second generator;

performing, with the discriminator, a true or false discrimination between the reference image corresponding to the sample image and the output image of the second generator to determine an adversarial loss of the second generator;

determining a reconstruction loss of the second generator based on a difference between the reference image corresponding to the sample image and the output image of the second generator; and determining the loss value of the second generator based on the adversarial loss and the reconstruction loss.

16. The electronic device of claim 14, wherein in the generative adversarial network, a network layer comprises an input layer, an intermediate layer and an output layer, and determining the distillation loss between the adjusted second generator and the first generator based on the sample image, the adjusted second generator and the first generator comprises:

processing the sample image with the first generator and the adjusted second generator respectively, to obtain an output image of the first generator and an output image of the second generator, and determining an output distillation loss based on a difference between the output image of the first generator and the output image of the second generator, the output distillation loss being a distillation loss between an output layer of the second generator and an output layer of the first generator.

17. The electronic device of claim 16, wherein determining the output distillation loss based on the difference between the output image of the first generator and the output image of the second generator comprises:

determining a structural similarity loss between the output image of the second generator and the output image of the first generator based on a brightness and contrast of the output image of the second generator and a brightness and contrast of the output image of the first generator;

determining a perceptual loss between the output image of the first generator and the output image of the second generator by performing feature extraction on the output image of the first generator and the output image of the second generator with a feature extraction network, respectively; and determining the output distillation loss based on the structural similarity loss and the perceptual loss.

18. A non-transitory computer-readable storage medium, wherein the non-transitory computer-readable storage medium stores computer-executable instructions which, when executed by a processor, carry out a method for data processing adapted to a generative adversarial network obtained by model distillation, wherein the method comprises:

obtaining an image to be processed; and processing the image with a first generator to obtain a processed image;

wherein the generative adversarial network comprises the first generator, a second generator and a discriminator, the model distillation is a process of alternately training the first generator and the second generator comprising:

determining a loss value of the second generator based on sample data and the discriminator, the sample data comprising a sample image and a reference image corresponding to the sample image;

adjusting the second generator based on the loss value of the second generator;

determining a distillation loss between the adjusted second generator and the first generator based on the sample image, the adjusted second generator and the first generator; and adjusting the first generator based on the distillation loss, and a model scale of the first generator is smaller than a model scale of the second generator.

* * * * *